(12) United States Patent
Marasco

(10) Patent No.: US 11,220,165 B2
(45) Date of Patent: Jan. 11, 2022

(54) COMPARTMENT SEALING SYSTEM

(71) Applicant: Albert Marasco, Altoona, IA (US)

(72) Inventor: Albert Marasco, Altoona, IA (US)

( * ) Notice: Subject to any disclaimer, the term of this patent is extended or adjusted under 35 U.S.C. 154(b) by 235 days.

(21) Appl. No.: 16/278,864

(22) Filed: Feb. 19, 2019

(65) Prior Publication Data

US 2019/0255925 A1   Aug. 22, 2019

Related U.S. Application Data

(60) Provisional application No. 62/632,073, filed on Feb. 19, 2018.

(51) Int. Cl.
| | |
|---|---|
| *B60J 10/84* | (2016.01) |
| *B60J 10/246* | (2016.01) |
| *B62D 65/06* | (2006.01) |
| *B60R 5/00* | (2006.01) |
| *B60J 5/00* | (2006.01) |
| *B60R 13/06* | (2006.01) |

(52) U.S. Cl.
CPC ............. *B60J 10/84* (2016.02); *B60J 5/00* (2013.01); *B60J 10/246* (2016.02); *B60R 5/00* (2013.01); *B60R 13/06* (2013.01); *B62D 65/06* (2013.01)

(58) Field of Classification Search
CPC .. B60R 13/06; B60J 10/84; B60J 10/85; B60J 10/246
See application file for complete search history.

(56) References Cited

U.S. PATENT DOCUMENTS

| | | | | |
|---|---|---|---|---|
| 5,499,475 | A * | 3/1996 | Court | E06B 7/2312 49/368 |
| 8,414,063 | B2 * | 4/2013 | Watson | B60J 10/87 296/146.9 |
| 8,950,797 | B2 * | 2/2015 | Watson | B60J 10/87 296/146.9 |
| 2002/0108313 | A1 * | 8/2002 | Nozaki | B60J 10/16 49/441 |
| 2012/0161463 | A1 * | 6/2012 | Mori | B60J 10/90 296/107.04 |

FOREIGN PATENT DOCUMENTS

| | | | |
|---|---|---|---|
| DE | 20 2011 108 524 | * | 3/2012 |
| JP | 59-14519 | * | 1/1984 |

* cited by examiner

*Primary Examiner* — Gregory J Strimbu
(74) *Attorney, Agent, or Firm* — Christopher A. Proskey; BrownWinick Law Firm

(57) ABSTRACT

An exemplary sealing system includes a frame having a generally ring shape with a body and a ledge extending from the body. The exemplary sealing system further includes a ring shaped seal having a body with a finger extension extending therefrom and contacting the body of the frame to create a seal. The ledge forms a gutter region allowing water and/or contaminated to flow around and out of the frame to prevent the same from entering a compartment of a vehicle.

15 Claims, 24 Drawing Sheets

COMPARTMENT SEALING SYSTEM

CROSS-REFERENCE TO RELATED APPLICATIONS

This Application claims the benefit of U.S. Patent Application No. 62/632,073 filed with the United States Patent and Trademark Office on Feb. 19, 2018, the entire contents of which are herein incorporated by reference

BACKGROUND

1. Field

Example embodiments relate to a system having a compartment, a door covering the compartment, and a sealing system to seal the compartment from the entry of water or contaminants into the compartment.

2. Description of the Related Art

Recreational vehicles (RVs) have storage compartments for storing items including clothing, electronics, equipment and the like. Such compartments are generally positioned along the lower side of the RV and are covered by a door which closes over the storage compartment. Conventionally, a rubber seal surrounds an opening of the storage compartment and prevents contaminants, for example, water and dust, from entering the storage compartment when the door is closed. There are times, however, where water or dust will breach the seal and contaminate the contents of a storage compartment. Furthermore, some seals require an RV owner to apply large amounts of force to close the door over the storage compartment forcing some RV owners to slam the compartment door hoping the door will latch properly or use their hips or knees to apply the proper force. However, this, at times, leads to denting or damaging of the doors.

SUMMARY

The inventors set out to design a sealing system usable for sealing storage compartments of RVs. As a result, the inventors invented a sealing system which is usable not only with RVs, but compartments of other vehicles as well, including, but not limited to, cars, buses, trucks, trailers and airplanes. As such, the inventive concepts disclosed in this application should not be limited to uses only in the RV industry.

In accordance with example embodiments, a sealing system may include a frame having a generally ring shape with a body and a ledge extending from the body, and a ring shaped seal having a body with a finger extension extending therefrom and contacting the body of the structure.

In accordance with example embodiments, a method of attaching a sealing system to a vehicle may include providing a door with a ring-shaped frame and a ring-shaped seal connected to one another by a removable strip having adhesive thereon, the seal including a second adhesive an on outer surface to bond the seal to the vehicle. The method may further include the step of attaching the door to the vehicle so that when the door is closed a compartment of the vehicle is covered. The method may further include the step of exposing the adhesive on the outer surface of the seal, closing the door to press the outer surface of the seal having the adhesive against the vehicle resulting in the seal circumscribing an entrance to the compartment and the adhesive being between the vehicle and the outer surface of the seal, allowing the adhesive on the outer surface of the seal to cure thereby fixing the seal to the vehicle, and removing the removable strip connecting the frame and the seal.

In accordance with example embodiments, a sealing system for a compartment of a vehicle is provided, wherein the compartment may include an edge that surrounds an opening providing access to a hollow interior of the compartment. The system may include a door assembly operatively connected to the vehicle and configured to move between an open position and a closed position, wherein the door assembly may be configured to cover the compartment when the door assembly is in a closed position and provide access to the compartment when the door assembly is in an open position. In at least one nonlimiting example embodiment, the door assembly may have an outer side, an inner side, an outer skin, an inner skin, and a frame member. The frame member may have a main body having an outer side, an inner side, an inward facing side, an outward facing side, and a channel that extends inward from the inner side of the main body of the frame member. The system may further include a seal member connected to the edge surrounding the opening of the compartment. In a nonlimiting example embodiment, the seal member may have a main body having an outer side, an inner side, an inward facing side, an outward facing side, and a finger. In example embodiments, the finger may extend outward from the outer side of the main body of the seal member. In example embodiments when the door assembly is in a closed position, the outer side of the main body of the seal member may engage the inner side of the channel of frame member thereby forming a first seal while the finger of the seal member overlaps with the channel. In example embodiments, when the door assembly is in the closed position, an outer end of the finger may engage the inner side of the main body of the frame member outward of the channel thereby forming a second seal. In example embodiments, when water, dirt or debris penetrates the second seal, the water, dirt or debris may be received by the channel of the frame member which may direct the water, dirt and debris around the opening in the compartment thereby preventing the water dirt or debris from entering the compartment.

Example embodiments provide a sealing system for a compartment of a vehicle. In example embodiments the compartment may have an edge that surrounds an opening that provides access to a hollow interior of the compartment. In example embodiments, the sealing system may include a door assembly operatively connected to the vehicle and configured to move between an open position and a closed position. The door assembly may be configured to cover the compartment when the door assembly is in a closed position and provide access to the compartment when the door assembly is in an open position. In one nonlimiting example embodiment the door assembly may have an outer side and an inner side. The door assembly may include a frame member having a main body that includes a channel extending inward from an inner side of the main body of the frame member. The system may further include a seal member connected to the edge surrounding the opening of the compartment. In one nonlimiting example embodiment the seal member may have a main body that includes a finger, wherein the finger extends outward from an outer side of the main body of the seal member. In example embodiments when the door assembly is in a closed position, an outer side of the main body of the seal member may engage an inner side of the channel of frame member thereby forming a first seal while the finger of the seal member overlaps with the channel. In example embodiments, when the door assembly is in a closed position, an outer end of the finger may engage an inner side of the main body of the frame member outward of the channel thereby forming a second seal. In example embodiments, when water, dirt or debris penetrates the second seal, the water, dirt or debris is received by the channel of the frame member directs the water, dirt and debris around the opening in the compartment thereby preventing the water dirt or debris from entering the compartment.

Example embodiments provide a method of installing a sealing member on a vehicle having a compartment. In example embodiments, the method may include the steps of: providing a door assembly having an outer side, an inner side and a frame member having a channel connected to the door assembly, a seal member having a finger connected to the frame member by a removable applicator; installing the door assembly on a vehicle having a compartment by at least one hinge such that the door assembly is configured to move between an open position and a closed position, wherein when in a closed position the door assembly covers the compartment, and wherein when in an open position the door assembly provides access to the compartment; removing a cover strip from an inward facing side of the seal member thereby exposing adhesive connected to the inward facing side of the seal member; closing the door assembly after the adhesive of the seal member is exposed such that the adhesive on the inward facing side of the seal member engages and adheres to an edge of the compartment; removing the removable applicator thereby separating the seal member from the frame member and allowing the door assembly to open and close while the seal member remains stationary on the edge of the compartment in precise alignment with the frame member.

BRIEF DESCRIPTION OF THE DRAWINGS

Example embodiments are described in detail below with reference to the attached drawing figures, wherein.

DETAILED DESCRIPTION

Figure 1:
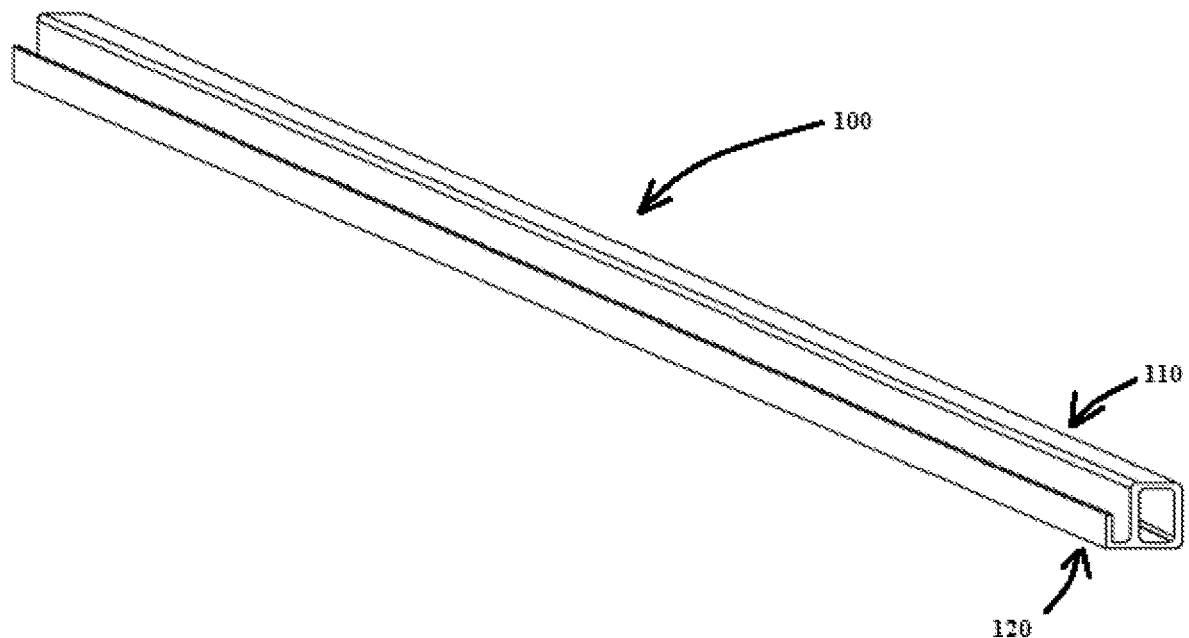
FIG. 1 is a view of a tube in accordance with example embodiments.

Example embodiments will now be described more fully with reference to the accompanying drawings, in which example embodiments are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a system 10 having a compartment, a door covering the compartment, and a sealing system to seal the compartment.

Figure 2A:
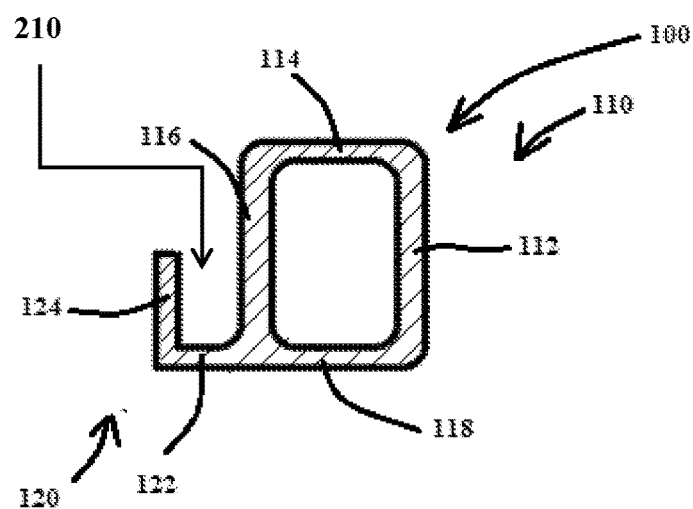
FIGS. 2A and 2B are alternative cross-sections of the tube in accordance with example embodiments.

FIG. 1 is a view of a tube 100 in accordance with example embodiments. FIG. 2A is a cross-section view of the tube 100 in accordance with example embodiments. As shown in FIGS. 1 and 2A, the tube 100 may include an elongated body 110 with an elongated ledge 120 extending therefrom. The body 110, for example, may be comprised of four sides 112, 114, 116, and 118 which form a hollow square or rectangular structure, however any other shaped member is hereby contemplated for use as body 110 in addition to square or rectangular, such as round, oval, triangular, diamond, pentagonal, octagonal, hexagonal, trapezoidal, or the like or any other shape. In addition, while body 110 is shown as hollow, it is hereby contemplated that body 110 may be solid and/or may include a plurality of support members or other components within the hollow interior shown.

The elongated ledge 120 may be comprised of a first member 122 extending from the body 110 and a second member 124 extending from the first member 122. As shown in at least FIGS. 1 and 2A, the elongated ledge 120 may be in the form of an L-shape when viewed from an end of the tube 100.

In the arrangement shown, as one example, first member 122 is generally planar and flat when viewed from an end of tube 100 and is connected to the lower side of elongated body 110 at the intersection of interior side 116 and lower side 118. In this arrangement, the plane formed by first member 122 extends outward from the lower side of side 116 in approximate perpendicular alignment to the plane formed by interior side 116. In this arrangement, the plane formed by first member 122 extends outward from the interior side of side 116 in approximate parallel alignment to the plane formed by lower side 118 such that the planes formed by first member 122 and side 118 form a flat and flush lower surface to tube 100.

In the arrangement shown, as one example, second member 124 is generally planar and flat when viewed from an end of tube 100 and is connected to the interior end of first member 122 and extends upwardly therefrom a distance. In this arrangement, the plane formed by second member 124 extends in approximate perpendicular alignment to the plane formed by first member 122 as well as side 118 and side 114. In this arrangement, the plane formed by second member 124 extends in approximate parallel alignment to the plane formed by side 116 and side 112. In the arrangement shown, as one example, second member 124 does not extend as far up as side 116. In this way, the combination and orientation of side 116, first member 122 and second member 124 form a channel or groove or recess or gutter region 210 there between that may receive and capture water and contaminants and direct the water and contaminants away from entering a storage compartment of the RV.

Figure 2B:
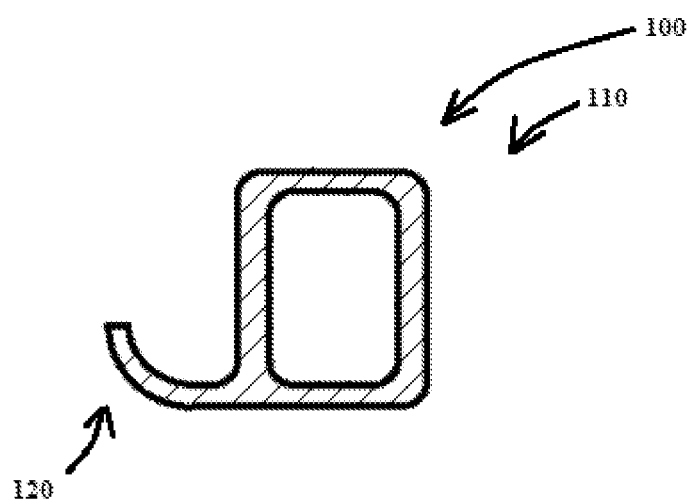

It is understood that the embodiment of FIGS. 1 and 2A is for purposes of illustration and is not intended to limit the invention. For example, the elongated body 110 illustrated in FIGS. 1 and 2A is illustrated as having a rectangular cross-section, however, the elongated body 110 may have a square cross section or a cross section having another polygon shape or any other shape. Furthermore, rather than being a hollow rectangular structure, the body 110 may alternatively be a substantially solid member having a solid cross-section or the hollow interior may include a plurality of or network of support members therein. In addition, while the elongated ledge 120 is illustrated as having an L-shape, the ledge 120 may actually have any other shape. For example, while the ledge 120 is illustrated as having a first member 122 having an orientation that extends outward perpendicular to the length of body 110, the first member 122 may be inclined from or positioned at an angle to the body 110. In addition, while the second member 124 is illustrated as being perpendicular to the first member 122, it may, in other embodiments, be inclined from or positioned at an angle to the first member 122 so that it is not perpendicular to the first member 122. Further yet, while the elongated ledge 120 is illustrated as being comprised of a first member 122 and a second member 124, the elongated ledge 120 may be in the shape of an arc, for example, a C-shaped member as shown in FIG. 2B and thus may be comprised of only a single member. Or alternatively, elongated ledge 120 may have any number of parts such as three, four, five, six, seven, eight, nine, ten or more.

In example embodiments, the tube 100 may be comprised of any suitable material. For example, in one embodiment, the tube 100 may be made from aluminum, an aluminum alloy or any other aluminum or aluminum-type material. In another embodiment, the tube 100 may be made from any other metallic material, such as iron, steel, a steel alloy or the like. In another embodiment, the tube 100 is made from plastic material, a composite material, a fiberglass material or any other non-metallic material. In one embodiment, tube 100 may be formed of a single unitary and monolithic component, such as being made by extrusion, casting, machining or the like. In yet another embodiment, the tube 100 may be formed of a combination of parts that are joined together through one or more manufacturing steps such as screwing or bolting or welding or assembling or the like. Tube 100 may be formed of a combination of metallic parts or components as well as non-metallic parts or components. As for the manufacturing process, one skilled in the art may recognize several methods which may be used to manufacture the tube 100. For example, extrusion, casting or molding may be used to manufacture the tube 100. For example, in one nonlimiting example embodiment, the tube 100 may be an extruded aluminum tube.

Figure 3:
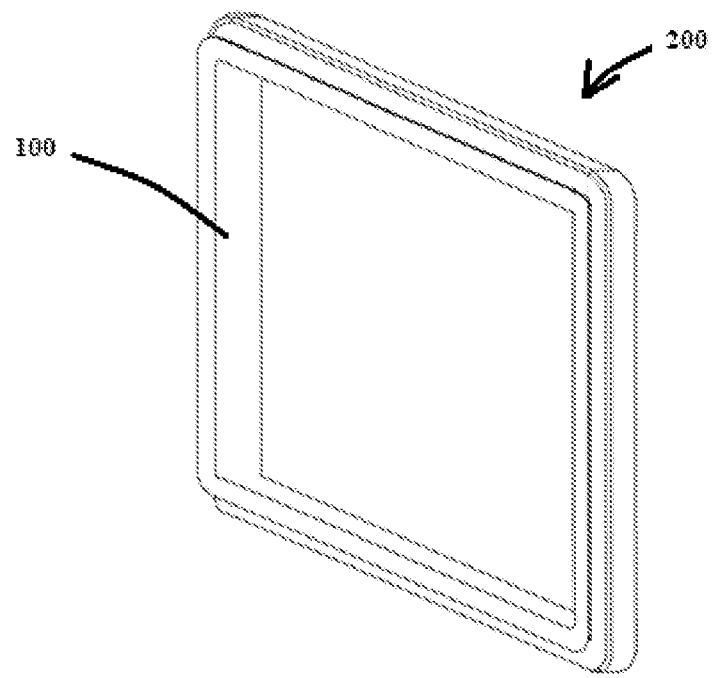
FIG. 3 is a view of a frame in accordance with example embodiments.
Figure 4A:
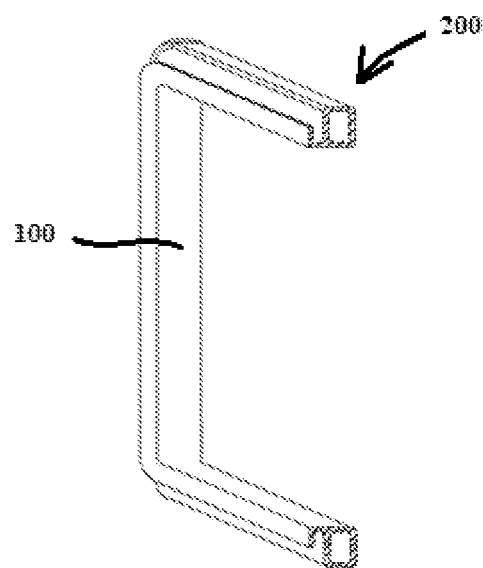
FIG. 4A is a first section view of the frame in accordance with example embodiments.
Figure 4B:
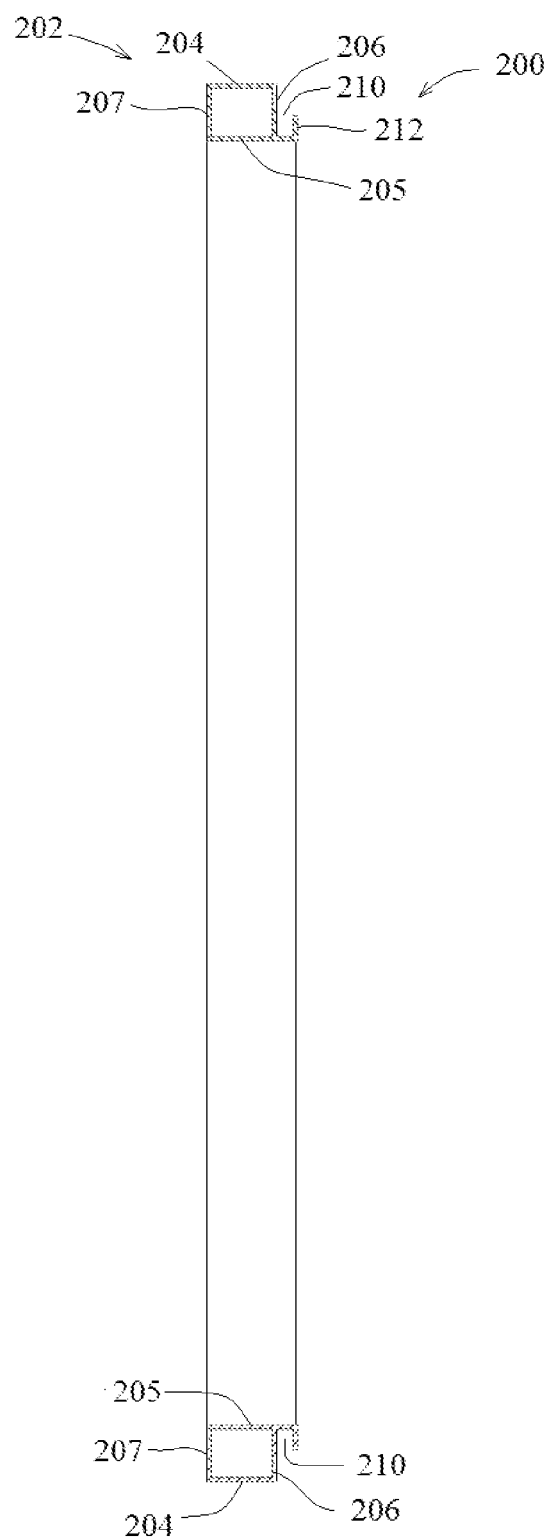
FIG. 4B is a second section view of the frame in accordance with example embodiments.

In example embodiments, the tube 100 may be used to make various structures. For example, FIGS. 3 and 4 illustrate the tube 100 bent to form a frame 200. In this nonlimiting example embodiment, the frame 200 may attach to a door configured to cover a compartment and may be used in conjunction with a seal 400 on the compartment to prevent water or dust from entering the compartment. It is understood that FIGS. 4A and 4B represent a section of the frame 200.

Figure 5:
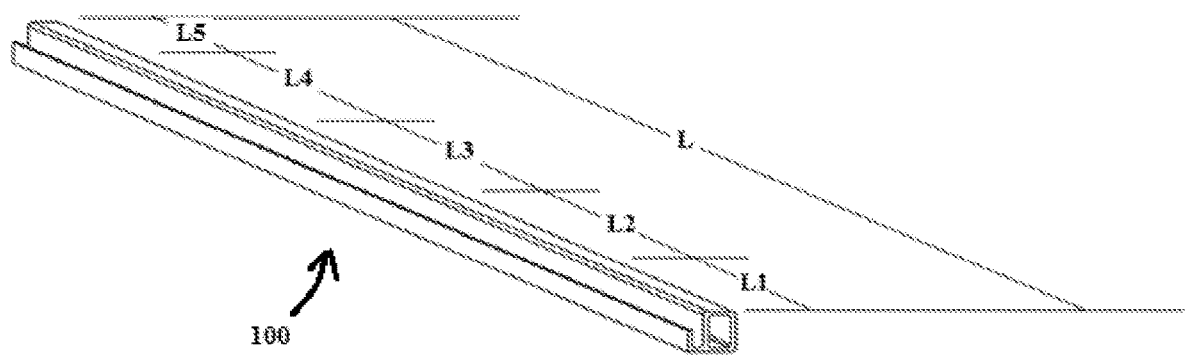
FIGS. 5-9 illustrate method steps associated with forming the frame in accordance with example embodiments.
Figure 6:
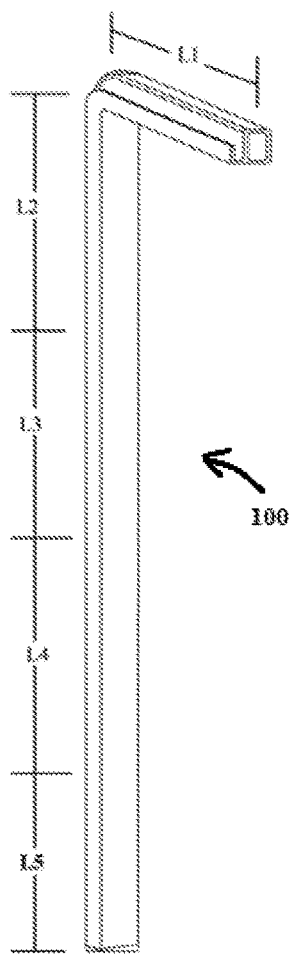
Figure 7:
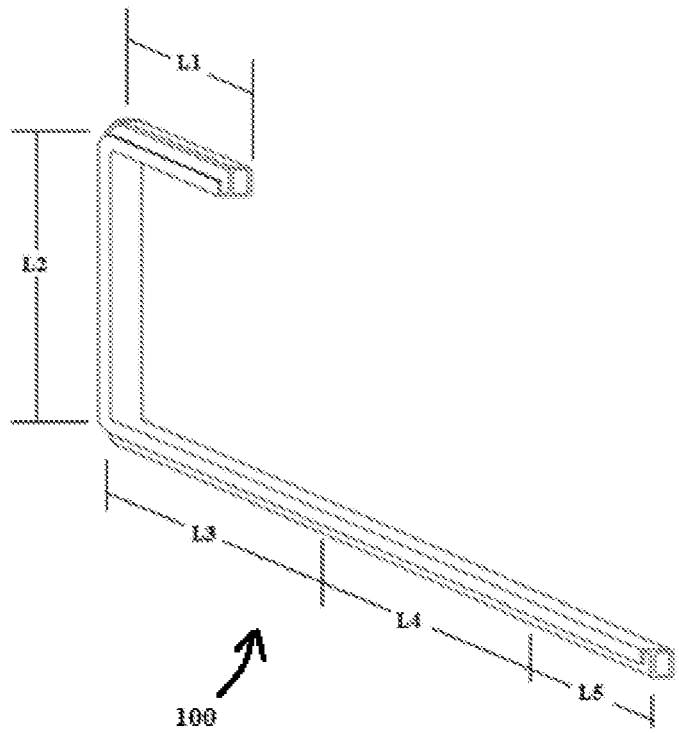
Figure 8:
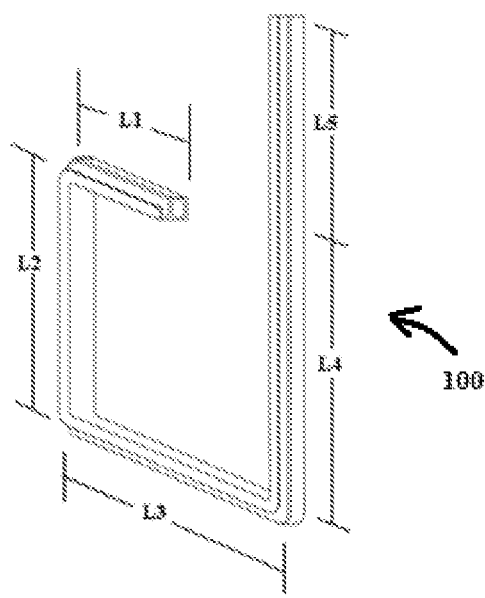
Figure 9:
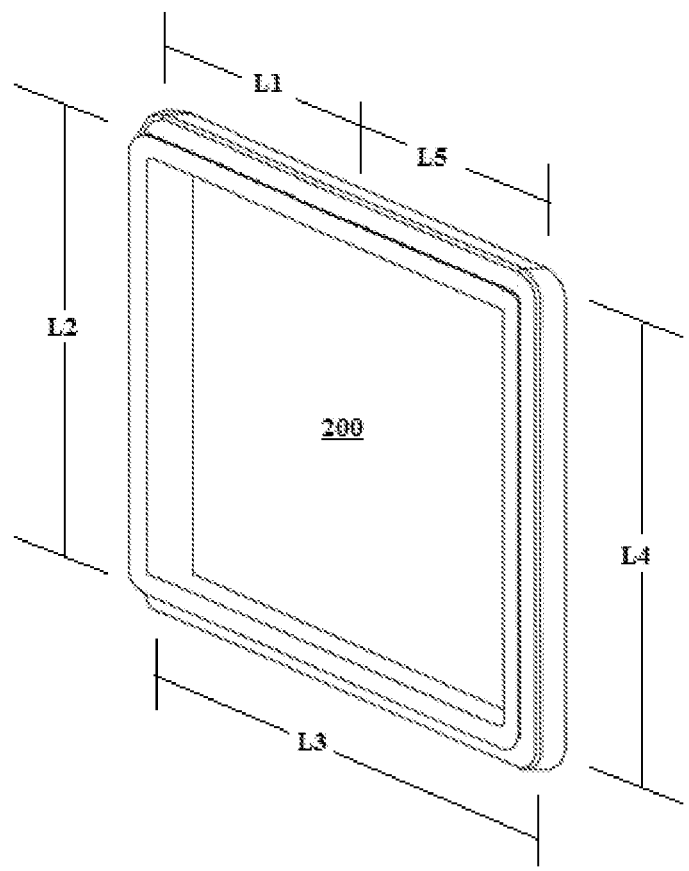

FIGS. 5-9 illustrate how the tube 100 may be formed into the frame 200. FIG. 5, for example, shows the tube 100 having a length L and four bending locations arranged at distances L1, L1+L2, L1+L2+L3, and L1+L2+L3+L4 away from a first end of the tube 100. Lengths L2, L3, and L4 may roughly correspond to the lengths of three of the sides of the frame 200 and L1 and L5, when added to together, may represent a length of a fourth side of the frame 200. As shown in FIG. 6, L1 may represent a distance at which the tube 100 is bent to form a substantially L-shaped configuration. The tube 100 may be bent a second time at a distance L2 from the first bend to form a J-shaped configuration as shown in FIG. 7. The tube 100 may be bent again at a distance of L3 from the second bend to obtain the configuration of FIG. 8. The tube 100 may be bent a fourth time at a distance L4 from the third bend to form the shape illustrated in FIG. 9 to form the frame 200. In the configuration of FIG. 9, ends of the tube 100 may be welded together to promote a relatively rigid sealed frame 200. In the alternative, an adhesive or a tape may be used to connect ends of the tube 100 together, or an adhesive may be used, or the ends may be friction fitted together, or the ends may be screwed or bolted together, or the ends may be connected together using a friction-fit member, or the ends may be connected together using a connecting member, or the ends may be connected together using connecting member that is inserted within the hollow interior of both ends, or the ends are connected together by riveting, or the ends may be connected by any other manner, method or means. The operations of FIGS. 5-9 are especially useful when the tube 100 is made from a metal, such as aluminum, which may undergo a plastic deformation.

As one skilled in the art would readily appreciate, the bending operations of FIGS. 5-9 result in the frame 200 illustrated in FIGS. 3 and 4A. FIG. 4B is a cross-section view of the frame 200. The frame 200 may be described as having a body 202 having an outer side 204, an inner side 205, and inward facing side 206 and an outward facing side 207. Extending from the body 202 is the aforementioned channel or gutter region 210 extending inward from the inner side 205 of the main body 202 of the frame 200. The channel 210 has an inner side 212 which may make contact with the seal 400.

In example embodiments the frame 200 has been illustrated as being formed from various bending operations applied to the tube 100. This, of course, is exemplary in nature and the frame 200 may be formed by another manufacturing process. In one example, frame 200 may be formed by, casting, molding or machining, which produces a ring shaped body having a ledge extending around the body. In another arrangement, frame 200 may be formed by cutting a plurality of lengths of tube 100 and connecting them together by any manner, method or means such as welding, gluing, adhering, using an end connector, screwing and/or bolting, using a snap fit feature, friction fitting, or by using any other manner, method or means of connection. In one arrangement, the ends of lengths of tube 100 are cut at a forty-five degree angle and are connected together to form a ninety degree corner. However, bending the tube 100 provides benefits, such as speed of manufacture, less cost and greater strength to the frame 200 as there is only one intersection, which is the connection between the two converging ends.

Figure 10:
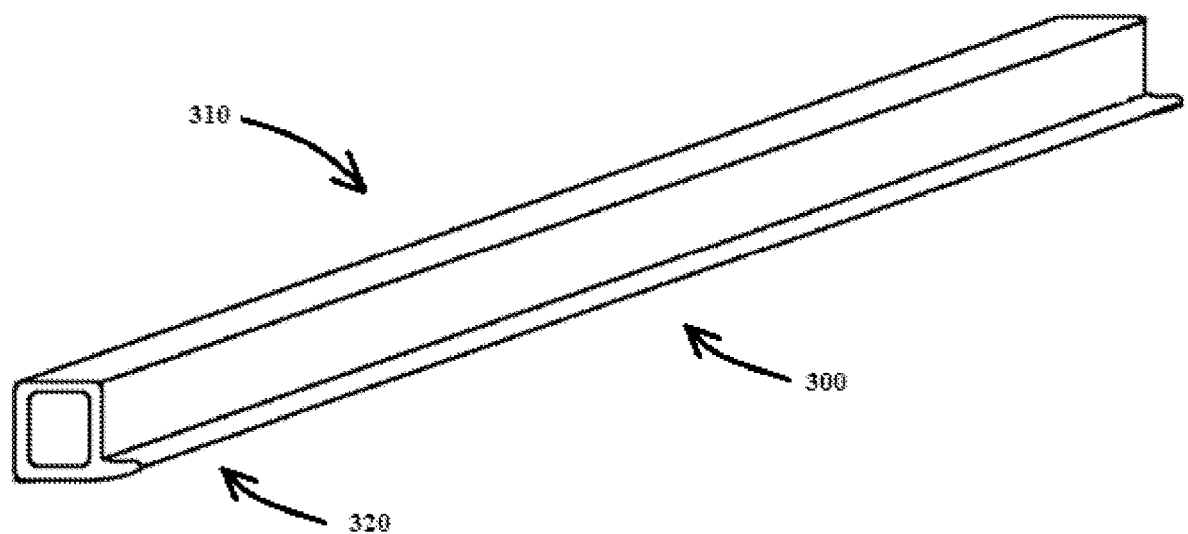
FIG. 10 is a view of a tubular member in accordance with example embodiments.
Figure 11:
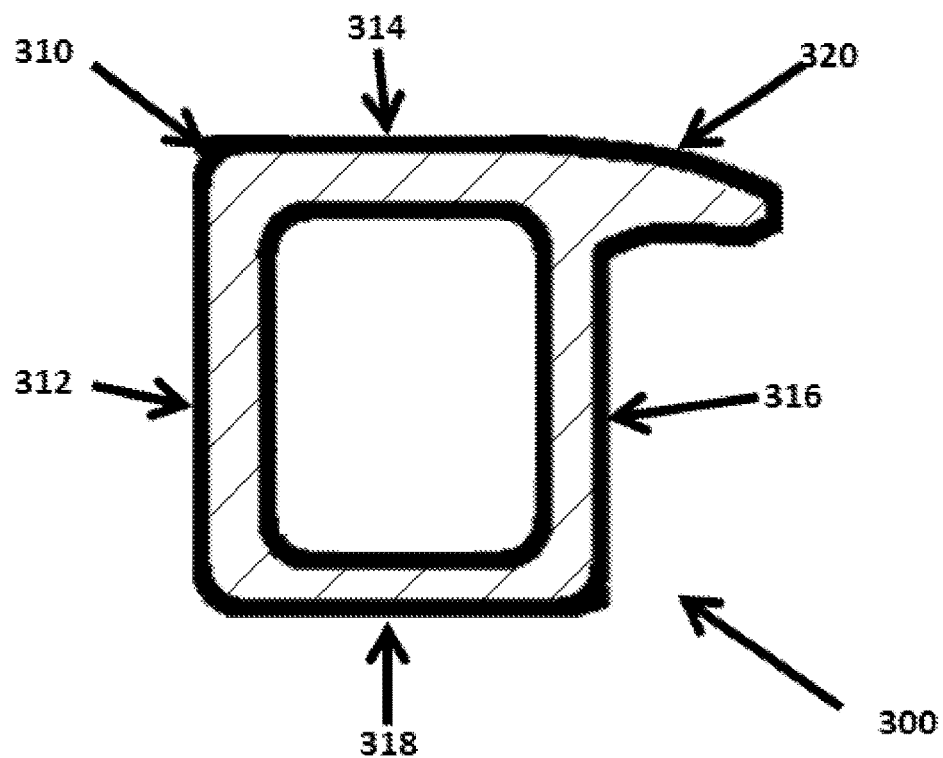
FIG. 11 is a cross-section view of the tubular member in accordance with example embodiments.

FIGS. 10 and 11 illustrate a view of a tubular member 300 which may form the aforementioned seal 400. As shown in FIGS. 10 and 11, the tubular member 300 may have an elongated body 310 and a finger like projection 320 extending along the elongated body 310. In the arrangement shown, The body 310, for example, may be comprised of four sides 312, 314, 316, and 318 which form a hollow square or rectangular structure, however any other shaped member is hereby contemplated for use as body 310 in addition to square or rectangular, such as round, oval, triangular, diamond, pentagonal, octagonal, hexagonal, trapezoidal, or the like or any other shape. In addition, while body 310 is shown as hollow, it is hereby contemplated that body 310 may be solid and/or may include a plurality of support members or other components within the hollow interior shown.

In the arrangement shown, as one example, projection 320 is generally planar and flat when viewed from an end of tubular member 300 and is connected to the upper side of elongated body 310 at the intersection of interior side 316 and upper side 314. In this arrangement, the plane formed by projection 320 extends outward from the upper side of side 316 in approximate perpendicular alignment to the plane formed by interior side 316. In this arrangement, the plane formed by projection 320 extends outward from the interior side of side 314 in approximate parallel alignment to the plane formed by upper side 314 such that the planes formed by projection 320 and side 314 form a flat and flush upper surface to tubular member 300.

However, in the arrangement shown, as one example, as the finger 320 extends outward from the intersection of side 316 and side 314, the projection may begin to curve or angle downward slightly. This downward angling or curvature may be configured to perform or facilitate at least two functions. First, when the door is closed and the tubular member 300 engages the tube 100, the outward end of finger 320 engages the interior surface of side 116 of tube 100. The downward angling of the outward end of projection 320 causes projection to bend or deform toward the channel or gutter region 210 of tube 100 as the projection 320 compresses. This causes a seal between the outward facing and/or upper end of projection 320 and the inward facing upper end of side 116 of elongated body 110 of tube 100. This engagement between projection 320 and side 116 of elongated body 110 of tube 100 also causes projection 320 to angle toward channel or gutter region 210 and as such any water or contaminants that gets on top of tubular member 300 is naturally guided toward channel or gutter region 210 which captures the water and/or contaminants and guides them around the opening 802 in compartment 800 and allows them to drain out the bottom. This is opposed to allowing the water and contaminants to inevitably enter the compartment 800.

Figure 12:
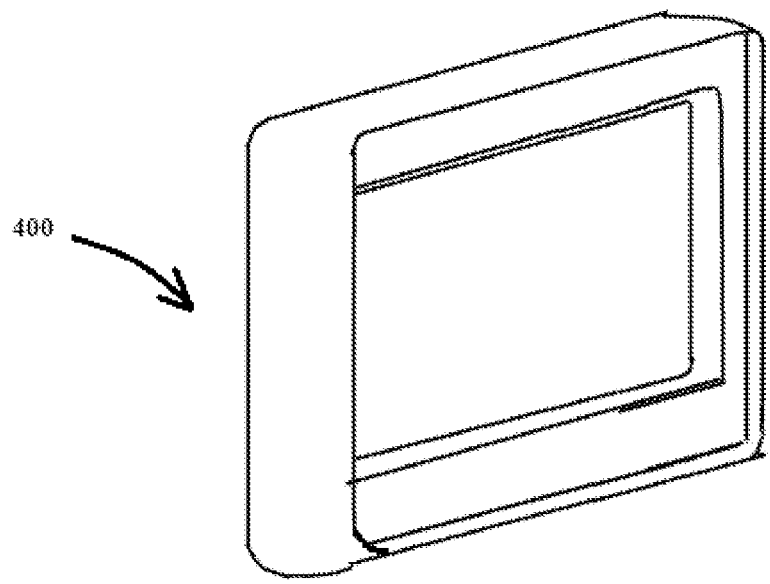
FIG. 12 is a view of a seal in accordance with example embodiments.
Figure 13A:
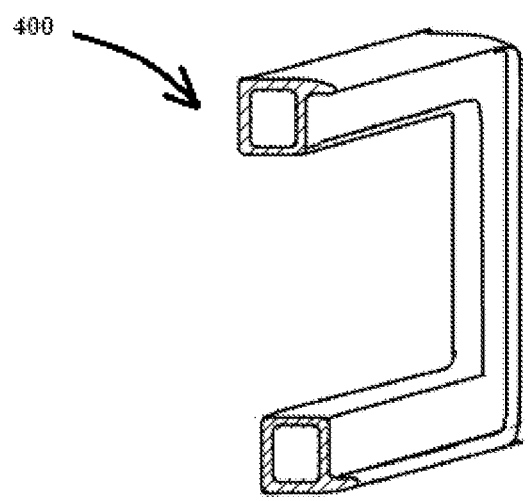
FIG. 13A is a first section view of the seal in accordance with example embodiments.
Figure 13B:
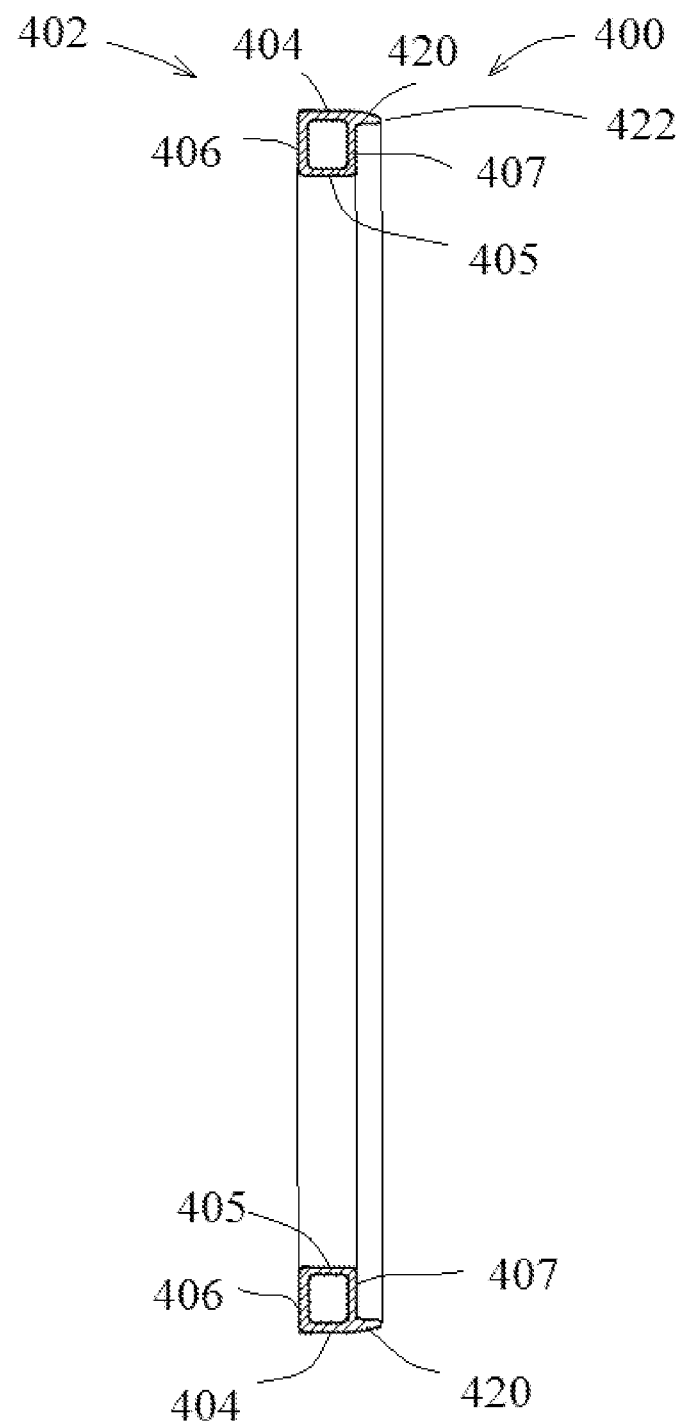
FIG. 13B is a second section view of the seal in accordance with example embodiments.

FIG. 12 illustrates the tubular member 300 deformed into a ring shape to form the seal 400. FIG. 13A illustrates a first section through the seal 400. FIG. 13B illustrates a second section view of the seal 400. As shown in FIG. 13B, the seal 400 may include a body 402 having an outer side 404, an inner side 405, an inward facing side 406, and an outward facing side 407. The seal 400 further has the finger 420 extending outward from the outer side 404 of the body 402 of the seal 400.

In one embodiment, seal 400 may be formed of a single unitary and monolithic component, such as being made by extrusion, casting, machining or the like. In yet another embodiment, the seal 400 may be formed of a combination of parts that are joined together through one or more manufacturing steps such as screwing or bolting or welding, or gluing, or adhering, or assembling or the like.

As one example, like tube 100, seal 400 may be formed by taking tubular member 300 having a length L and four bending locations arranged at distances L1, L1+L2, L1+L2+L3, and L1+L2+L3+L4 away from a first end of the tubular member 300. Lengths L2, L3, and L4 may roughly correspond to the lengths of three of the sides of the frame 200 and/or compartment 800 and L1 and L5, when added together, may represent a length of a fourth side of the frame 200. L1 may represent a distance at which the tubular member 300 is bent to form a substantially L-shaped configuration. The tubular member 300 may be bent a second time at a distance L2 from the first bend to form a J-shaped configuration. The tubular member 300 may be bent again at a distance of L3 from the second bend. The tubular member 300 may be bent a fourth time at a distance L4 from the third bend to form the shape illustrated in FIG. 12 to form the seal 400. In the configuration of FIG. 12, ends of the tubular member 300 may be welded together to promote a relatively rigid and durable connection. In the alternative, an adhesive or a tape may be used to connect ends of the tubular member 300 together, or an adhesive may be used, or the ends may be friction fitted together, or the ends may be screwed or bolted together, or the ends may be connected together using a friction-fit member, or the ends may be connected together using a connecting member, or the ends may be connected together using connecting member that is inserted within the hollow interior of both ends, or the ends are connected together by riveting, or the ends may be connected by any other manner, method or means.

In example embodiments the seal 400 has been illustrated as being formed from various bending operations applied to tubular member 300. This, of course, is exemplary in nature and the seal 400 may be formed by another manufacturing process. In one example, seal 400 may be formed by cutting a plurality of lengths of tubular member 300 and connecting them together by any manner, method or means such as welding, gluing, adhering, using an end connector, screwing and/or bolting, using a snap fit feature, friction fitting, or by using any other manner, method or means of connection. In one arrangement, the ends of lengths of tubular member 300 are cut at a forty-five degree angle and are connected together to form a ninety degree corner. However, bending the tubular member 300 provides benefits, such as speed of manufacture, less cost and improved sealing as there is only one intersection in the seal 400, which is the connection between the two converging ends.

Figure 14:
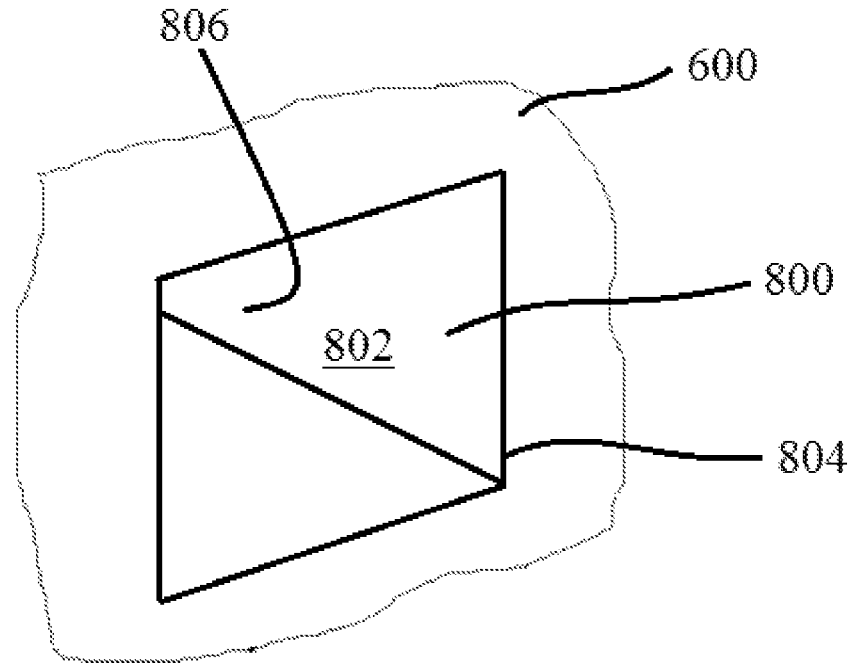
FIG. 14 is a view of a compartment associated with a structure in accordance with example embodiments.
Figure 15:
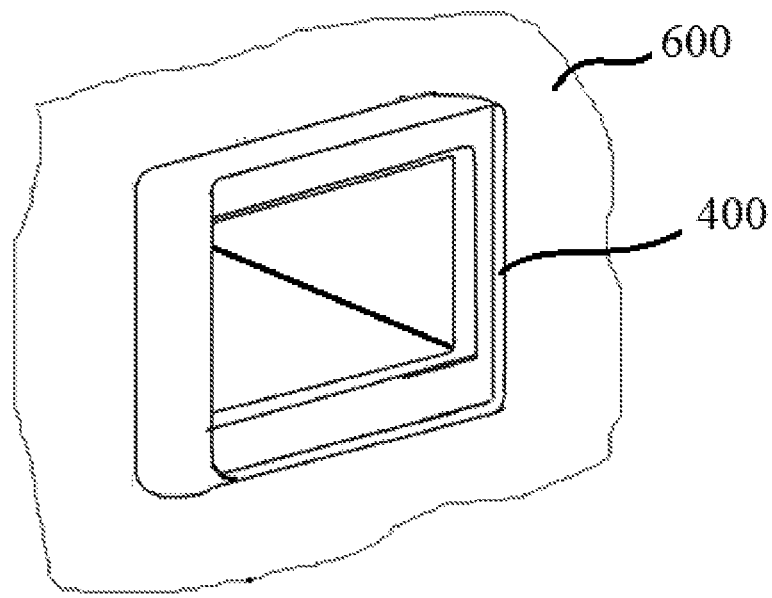
FIG. 15 is a view of the seal surrounding an opening of the compartment.
Figure 16:
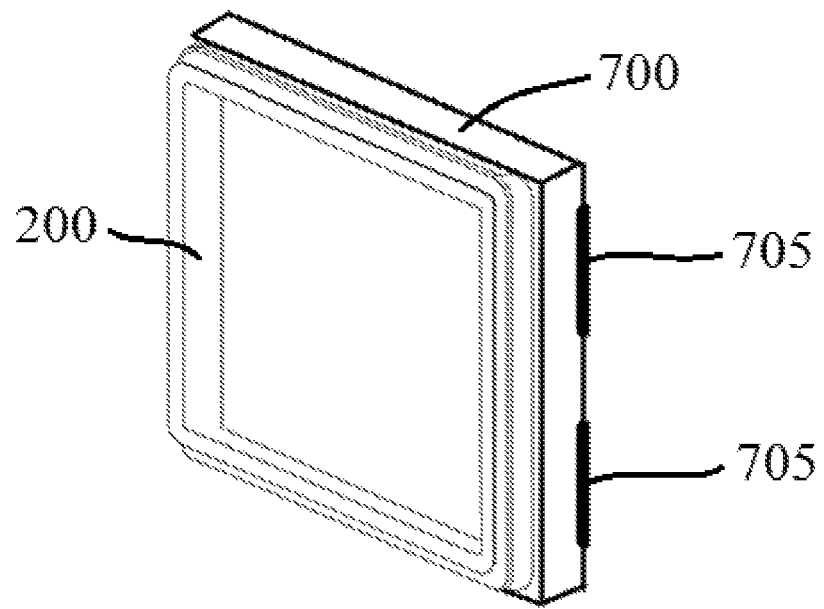
FIG. 16 illustrates an example of the seal on a door in accordance with example embodiments.

In example embodiments, the tube 300 used to form the seal 400 may be made of a relatively flexible material, for example, a foam, a rubber, a foam rubber, or any other flexible and/or compressible material which is capable of forming a seal and which may allow the seal 400 to be in sealing engagement with the frame 200. For example, FIG. 14 illustrates a portion of a recreational vehicle 600 having an opening 802 for a compartment 800 in which items may be stored. The opening 802 may be defined by an edge 804 that surrounds the opening 802 of the compartment 800. The opening 802 provides access to a hollow interior 806 of the compartment 800. In example embodiments, the seal 400 may be placed in a manner that circumscribes or surrounds the opening of the compartment 800 as shown in FIG. 15. In this arrangement, seal 300 is attached to the body of recreational vehicle 600 by any manner, method or means such as by adhering, gluing, taping or friction fitting or any other method or means or combination thereof.

A door 700 may be attached to the recreational vehicle 600 by any manner, method or means, such as by hinges or the like. In one arrangement, frame 200 is attached to an interior surface of door 700 such as by gluing, welding, adhering, taping, screwing, bolting, or by any other manner, method or means or combination thereof. In one arrangement, when the door 700 is closed, frame 200 comes into sealing engagement with the seal 400. When the door 700 is closed, the opening 802 of the compartment 800 is covered.

Figure 17:
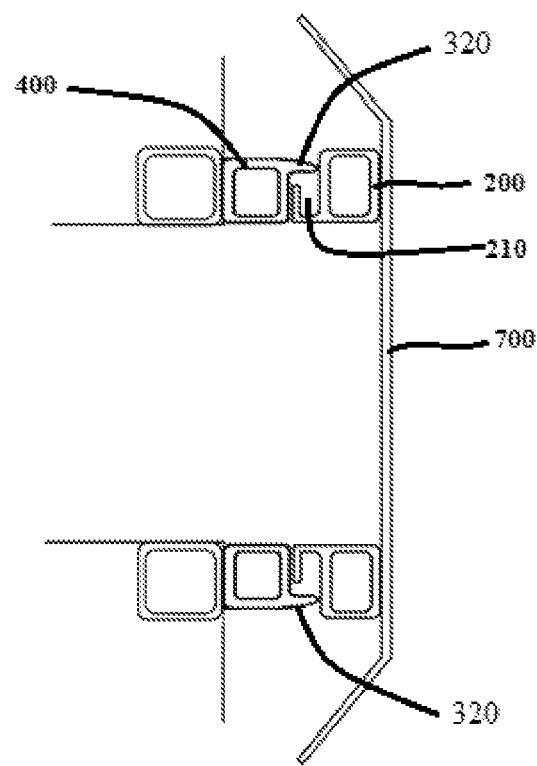
FIG. 17 is a view of a system having a sealing system in accordance with example embodiments.

More specifically, as one example, with reference to FIG. 17, door 700 is in a closed position showing frame 200 in engagement with seal 400. In this position, frame 200 and seal 400 connect to one another in two places making two distinct seals.

First, at the upper end of frame 200 and seal 400, the finger like projection 320 extends to engage and be slightly compressed by, the body 110 of the frame 200. More specifically, as is shown in this arrangement, the upper and outward end of projection 320 engages the upper interior surface of side 116 of elongated body of frame 200 adjacent its upper end. This forms the first seal between frame 200 and seal 400.

Notably, when the door is closed and the tubular member 300 engages the tube 100, the outward end of finger 320 engages the interior surface of side 116 of tube 100. The downward angling of the outward end of projection 320 causes projection to bend or deform toward the channel or gutter region 210 of tube 100 as the projection 320 compresses. This causes a seal between the outward facing and/or upper end of projection 320 and the inward facing upper end of side 116 of elongated body 110 of tube 100. This engagement between projection 320 and side 116 of elongated body 110 of tube 100 also causes projection 320 to angle toward gutter region 210 and as such any water or contaminants that gets on top of tubular member 300 is naturally guided toward gutter region 210 which captures the water and/or contaminants and guides them around the opening 802 in compartment 800 and allows them to drain out the bottom. This is opposed to allowing the water and contaminants to inevitably enter the compartment 800.

Second, at the lower end of frame 200 and seal 400, the generally planar shaped exterior facing surface of the upward extending second member 124 of elongated ledge 120 of frame 200 engages the lower end of the outward facing side 316 of seal 400. This engagement between second member 124 of frame 200 and side 316 of seal 400 causes seal 400 to slightly compress thereby forming a seal between second member 124 of frame 200 and side 316 of seal 400. This forms the second seal between frame 200 and seal 400.

The combination of the first seal and the second seal provides greatly increased sealing between frame 200 and seal 400. The upper seal or first seal helps prevent water and contaminants from entering between the door 700 and the recreational vehicle 600. However, some water or contaminants that get on top of seal 400 may inevitably end up penetrating between the frame 200 and seal 400. This arrangement accounts for that inevitability by capturing this water and contaminants within gutter region 210 which prevents the water and contaminants from entering the compartment 800 and instead directs the water and contaminants around the compartment 800 to drain out the bottom end of the door 700. The compartment 800 is further protected by the second seal between frame 200 and seal 400. This seal prevents any additional water or contaminants from entering compartment. This second seal is covered by projection 320 and is inset past projection 320 which protects and covers this second seal and prevents water and contaminants from sitting directly upon this second seal. It is substantially unlikely that any water or contaminants that get past the first seal also get past the second seal. In this way, the combination of the first seal and the second seal greatly reduce any entry of water and contaminants into compartment 800.

In one embodiment, the finger like projection 320 may continuously contact the body 110 of the frame 200 so that the compartment 800 is completely sealed by the frame 200 and the seal 400. In this embodiment, the outside surface of the elongated ledge 120 may press against the body 310 of seal 400 to provide a secondary seal.

Figure 18:
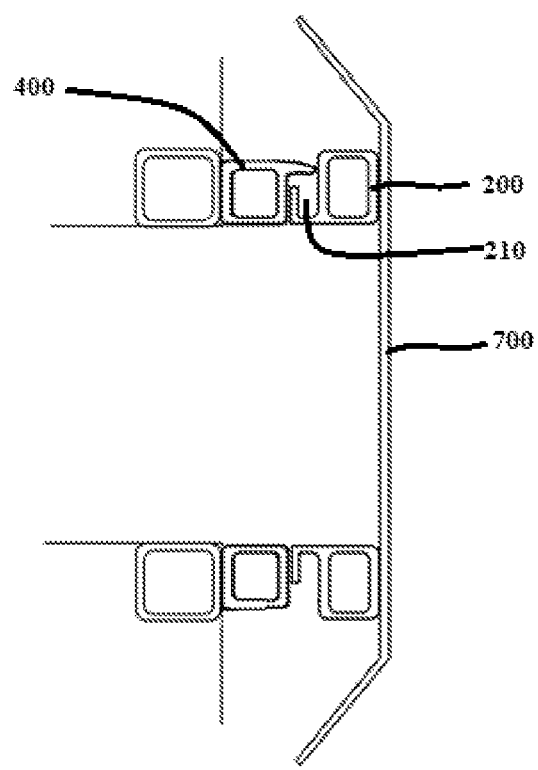
FIG. 18 is view of a system having a sealing system in accordance with example embodiments.

In use, the finger like projection 320 contacting the body 110 of the frame 200 will, in most cases, prevent water and dust from entering the compartment 800 protected by the seal 400 and the frame 200. However, it is anticipated, under certain circumstances, that some water or dust may pass beyond the interface of the fingerlike projection 320 and the body 110 of the frame 200. However, rather than entering the compartment 800, water or dust would simply flow into a gutter region 210 of the frame 200 rather than into the compartment. In view of this, modifications of the above sealing frame 200 and 400 are contemplated. For example, holes or notches or perforations or any other relief may be cut at a bottom of the seal 400 along the bottom of the door 700 and compartment 800, for example, in the bottom most fingerlike projection 320, in order to allow captured water to drain from the seal 400 as opposed to being held by seal 400. As yet another embodiment, the seal 400 may be formed in such a manner that the finger portion 320 of the seal 400 arranged at the lower most portion of the seal 400 is not present to allow water to drain from a channel, groove or gutter area of the structure. This embodiment is illustrated in FIG. 18.

Installation and Alignment:

In the arrangement shown, frame 200 is attached to door 700 and seal 400 is attached to recreational vehicle 600 (however it is contemplated that this arrangement may be reversed). Alignment of the frame 200 to the seal 400 is important to optimize sealing. As such, in one arrangement, the frame 200 and seal 400 are joined together in proper alignment then one of the frame 200 or seal 400 is installed on one of the door 700 or recreational vehicle 600 followed by installation of the other of the frame 200 or seal 400 installed on the other of the door 700 or recreational vehicle 600 and then the frame 200 and seal 400 are allowed to separate. This arrangement eases and speeds installation and ensures proper alignment of the frame 200 and seal 400.

Figure 19:
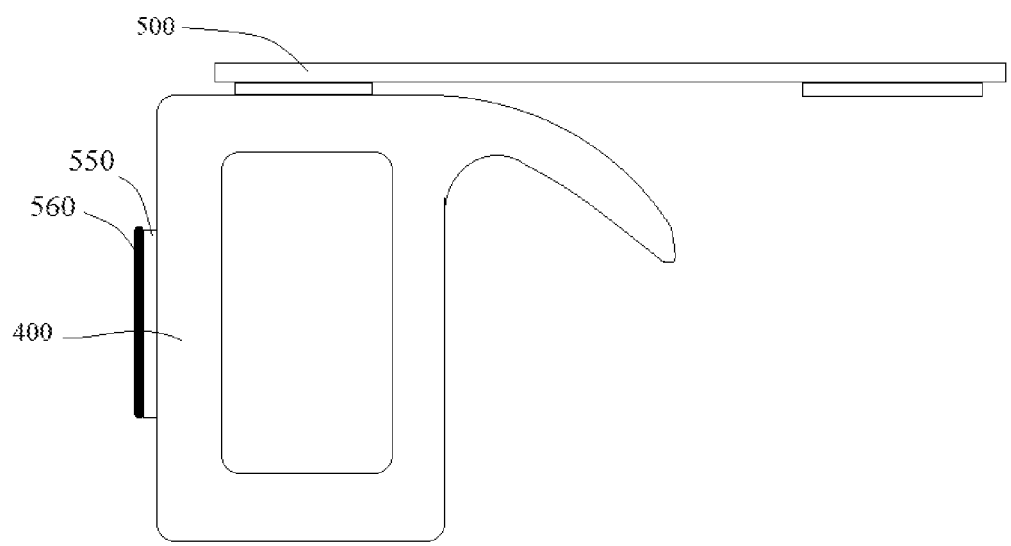
FIG. 19 is a view of a seal attached to a PC Applicator in accordance with example embodiments.
Figure 20:
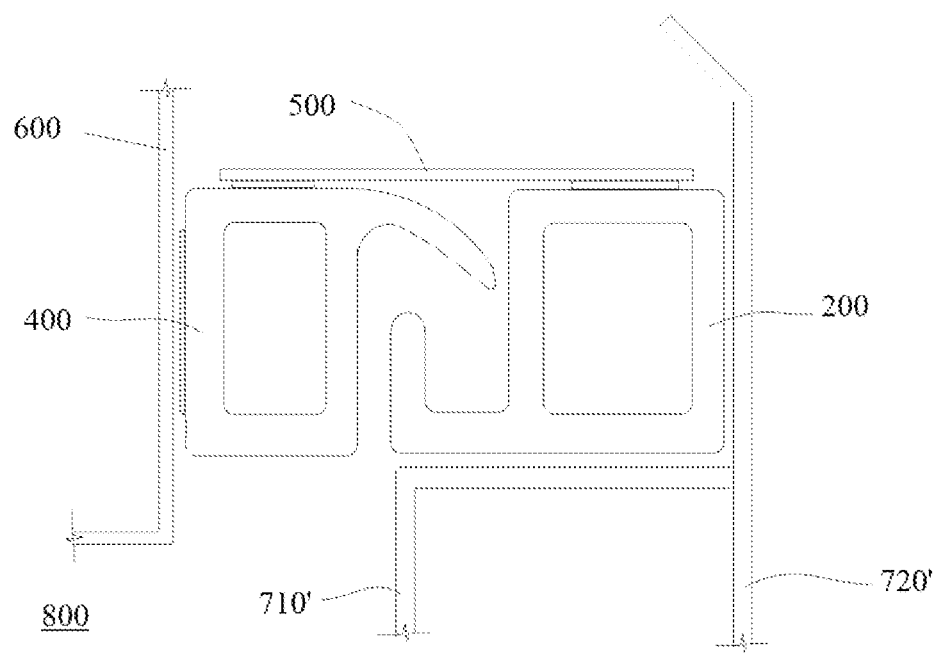
FIG. 20 is a view of a seal attached to a structure via the PC Applicator in accordance with example embodiments.

As one example, with reference to FIG. 19 is a view of the seal 400 with a PC Applicator 500 bonded thereto. FIG. 20 illustrates the seal 400 attached to the frame 200 via the PC Applicator 500. That is, seal 400 and frame 200 are placed in operative engagement with one another in the optimum alignment. Next, PC Applicator 500 is installed on the outward side of seal 400 and frame 200 thereby covering the intersection between seal 400 and frame 200 thereby holding the seal 400 and frame 200 together. In example embodiments, seal 400 and the frame 200 may be temporarily attached to one another when attaching the seal 400 to a compartment 800 door frame as well as when installing frame 200 on door 700. In this example embodiment, the frame 200 is attached to the door 700 while the seal 400 is attached to the frame 200 via the PC Applicator 500. Alternatively, the seal 400 is attached to the frame 200 after the frame 200 is installed on the door 700. However in one arrangement, it is desirable to sell the seal 400 and frame 200 joined by PC Applicator 500 from the factory so as to ensure proper alignment and fitting of the seal 400 with the frame 200 once installed. Regardless, the seal 400 illustrated in FIG. 19 may include an adhesive 550 on an inward facing side 406 of the seal 400 and the adhesive 550 may be covered by a cover strip 560 so that when the cover strip 560 is removed the adhesive 550 is exposed. The adhesive 550 and cover strip 560 may be used to connect the seal 400 to a panel of a vehicle 600.

The PC Applicator 500 maintains the optimum and desired relative positon of the seal 400 with respect to the frame 200. Frame 200 may be attached to the door 700 by any manner method or means such as by screwing, bolting, welding, gluing, adhering, taping or the like or any combination thereof. Next, the door is installed on the recreational vehicle 600, such as by hanging the door 700 on hinges 705 such that when the door 700 closes the door 700 covers compartment 800. Door 700 may be adjusted to ensure the proper alignment prior to installation of the seal 400 on recreational vehicle 600.

In one arrangement, to install the seal 400 on the recreational vehicle 600 in the optimum position an adhesive is applied to an outside surface of the seal 400. This adhesive may be a pressure sensitive adhesive such as a two-sided tape, two sided foam, glue or any other adhesive. In one arrangement, this adhesive on the outside surface of seal 400 is covered by a film such that when the film is in place the door 700 can be test closed to ensure proper alignment before the seal 400 is adhered. Once the door 700 is properly aligned, the film is removed and the door 700 is firmly closed and latched thereby causing a full and complete seal between the seal 400 and the recreational vehicle 600. The door 700 is left closed for a period of time, such as 24-hours for example, so as to allow the adhesive to fully cure. Once the adhesive between the recreational vehicle 600 and seal 400 has cured, the PC Applicator 500 that holds the door frame 200 and seal 400 together is removed. This can be easily done by pulling an end of the PC Applicator 500 and fishing it around the seam between the door 700 and the recreational vehicle 600. Once the PC Applicator 500 is fully removed, the frame 200 and seal 400 are fully released from one another and the door 700 may be opened leaving the seal 200 in the optimum position on recreational vehicle. In this way, the use of PC Applicator 500 ensures the seal 400 and the frame 200 are properly aligned with one another. The use of PC Applicator 500 also eases and speeds the installation process of seal 400.

In accordance with example embodiments, a sealing system may include a frame 200 having a generally ring shape with a body 110 and a ledge 120 extending from the body 110. The system may further include and a ring shaped seal 400 having a body 310 with a finger extension 320 extending therefrom and contacting the body 110 of the frame 200. The finger extension 320 may extend along at least three quarters of the circumferential length of the body 310 of the seal 400. This allows for an embodiment wherein the finger extension 320 allows water to drain from the lower end of the system. The body 110 of the frame 200 may be hollow, as shown in FIGS. 1, 2, and 4. The frame 200 may be attached to a door that when closed forces the frame 200 against the ring shaped seal 400 which may surround an opening of a compartment. When closed, the finger extension 320 presses against the body 110 of the frame 200 to create a seal. The compartment may be a compartment of a recreational vehicle and the door may be attached to the recreational vehicle in any number of ways including hinged attachments, but may also be slidingly attached to the recreational vehicle. This latter embodiment may be envisioned as a drawer type configuration.

Figure 22:
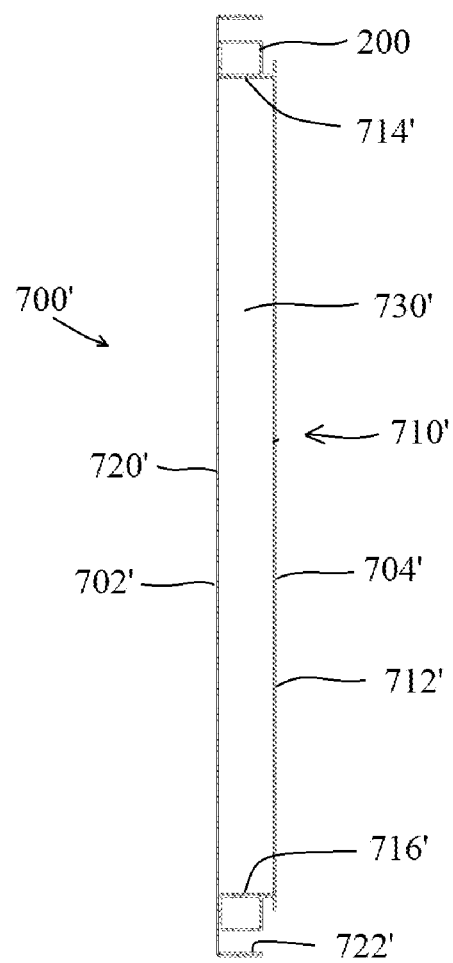
FIG. 22 is a section view of a door in accordance with example embodiments.
Figure 23:
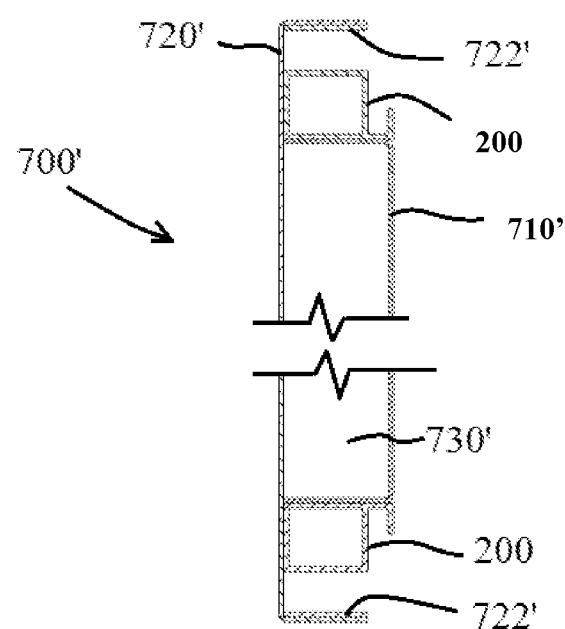
FIG. 23 is another section view of a door in accordance with example embodiments.
Figure 24:
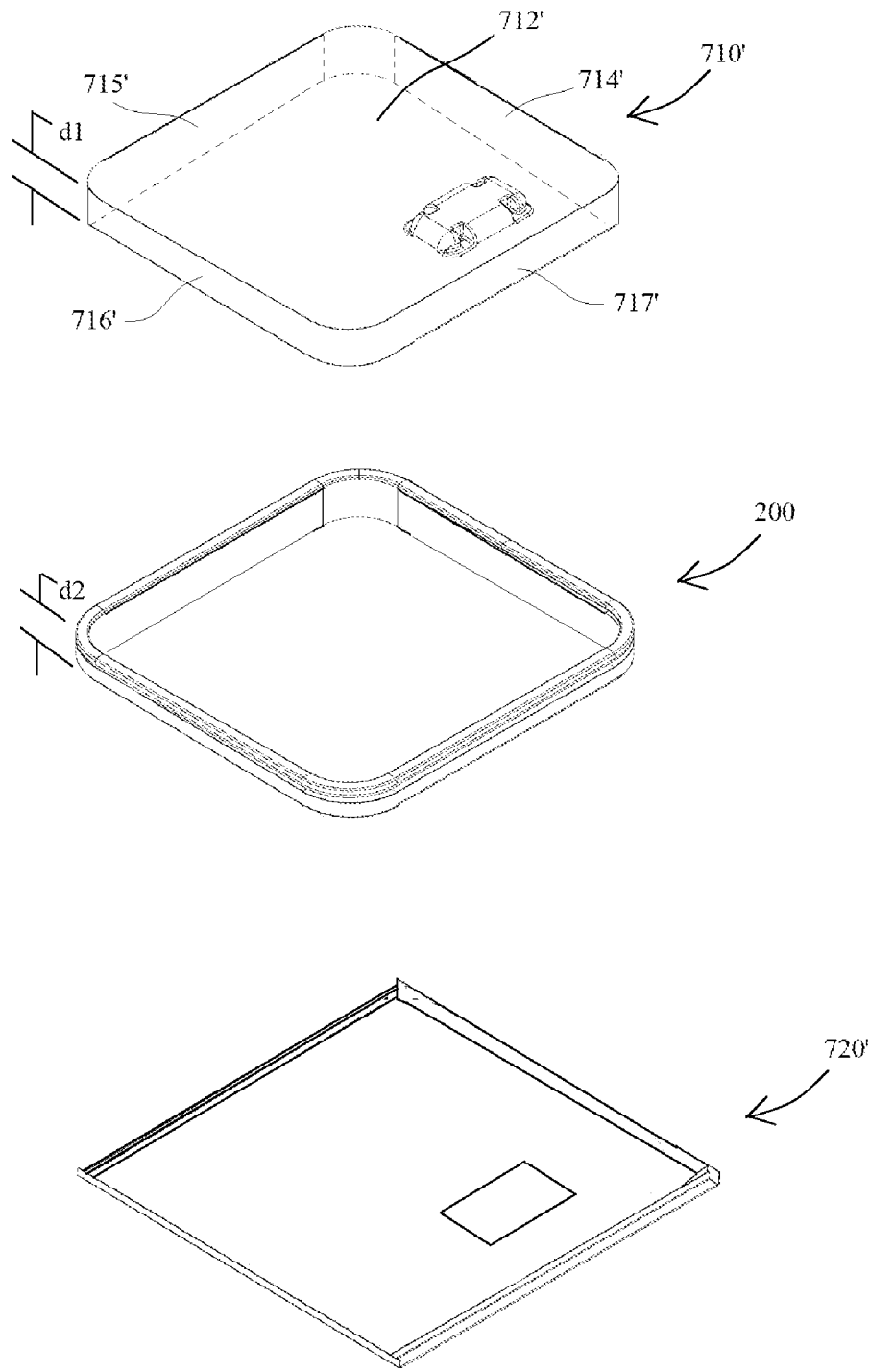
FIG. 24 is an exploded view of a door in accordance with example embodiments.
Figure 25:
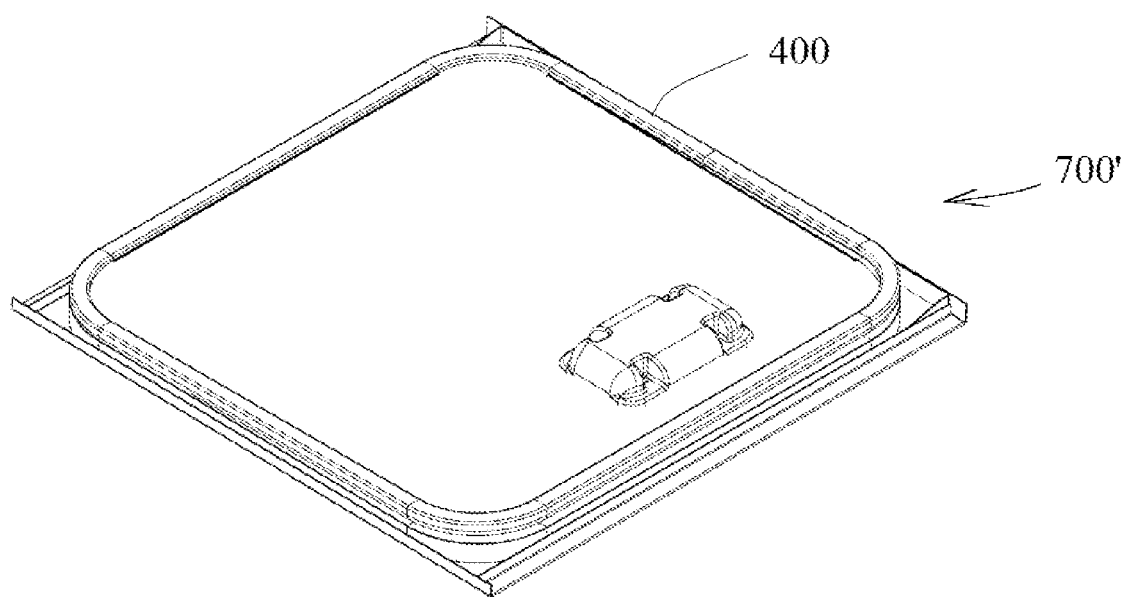
FIG. 25 is a perspective view of a door with a seal mounted thereon in accordance with example embodiments.

FIGS. 21-25 illustrate another example of a door 700' that uses the frame 200. In the nonlimiting example embodiment of FIGS. 21-25, the door 700' may have an outer side 702' and an inner side 704'. In the nonlimiting embodiment of FIGS. 21-25, the door 700' is illustrated as being comprised of three sections. The first section 710', as illustrated in FIG. 24, resembles a boxlike structure having an interior surface 712' (also called an inner skin) and four sides 714', 715', 716', and 717'. In the arrangement shown, sides 714', 715', 716', and 717' serve as end walls to interior surface 712'. In one arrangement, sides 714', 715', 716', and 717' and interior surface 712' are formed of a single member. In another arrangement, interior surface 712' a separate component to sides 714', 715', 716', and 717'. In this arrangement, sides 714', 715', 716', and 717' are formed of a metallic material and interior surface 712' is formed of a fiberglass or other non-metallic material and is added to an interior-positioned edge or flange of sides 714', 715', 716', and 717' by gluing, adhesive, screwing, bolting, welding or by any other manner, method or means or combination thereof.

In example embodiments, the interior surface 712' may be formed with an opening to accommodate a handle and/or locking system 718'. In the alternative, rather than being an opening, structure 718' illustrated in FIG. 24 may simply represent a convex surface formed in the interior surface 712' to accommodate the locking system. In the nonlimiting example embodiment of FIGS. 21-25, the interior surface 712' and the walls 714', 715', 716', and 717' may be made from a suitable material, for example, sheet metal. On the other hand, it could be made from alternative materials such as plastic, fiberglass or any other component or material. This latter material may be especially useful in a molding operation.

The second section may be the previously described frame 200. In example embodiments the depth d1 of the first section 710' may be substantially the same as the depth d2 of the frame 200. This may allow for an outer surface of the interior surface 712' of the first section 710' to be substantially in line with the outer surface of the gutter portion 210 of the frame 200 as illustrated in at least FIGS. 22 and 23.

In one arrangement, the engaging surfaces of frame 200 and door 700' are affixed to one another by gluing, bolting, welding, adhering, screwing or by any other manner, method or means or combination thereof.

The third section 720' may form an outside of the door 700' or an outer skin. In one arrangement, third section 720' forms a generally planar member that extends above and below and laterally past first section 710 and section (frame 200). In this way, the outward ends of the planar member of third section 720' terminate at an inwardly extending flange 722'. This flange 722' provides coverage for frame 200, seal 400 and first section 710'. This section 720' may be made from a sheet metal or other suitable material and may substantially cover the outside of the door 700'. In example embodiments, the third section 720' may have a hole therein to expose a handle and/or locking mechanism 718' that may be in the door 700'. In fact, each of the first section 710' and the frame 200 may have apertures formed therein to enable a locking system contained in the door 700'. Because such modifications would be easily understood by one of ordinary skill in the art, an illustration thereof is omitted for the sake of brevity.

Figure 21:
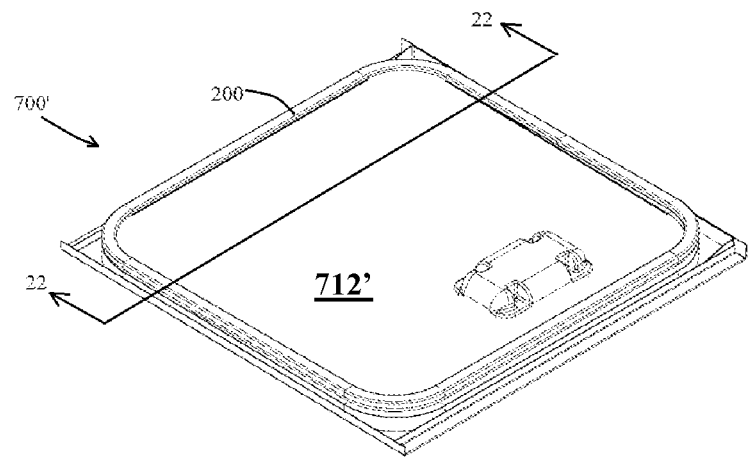
FIG. 21 is a view of a door in accordance with example embodiments.

FIG. 22 is a cross section of door 700' taken through line 22-22 of FIG. 21. FIG. 23 illustrates a close-up of the cross-section. As shown in FIGS. 22 and 23, the first section 710' fits within frame 200. In some embodiments, because the depth d1 of the first section 710' may be substantially the same as the depth d2 of the frame 200, an outer surface of the interior surface 712' may be substantially in-line with an outer surface of the frame 200 as shown in FIGS. 22 and 23.

In example embodiments the space 730' between the interior surface 712' of the first section '710 and the frame 200 may be filled with a material to reinforce the interior surface 712' and/or act as insulation for the door 700'. For example, the space 730' may be filled with a structural and or insulating foam material, and/or a hard-foam material.

In example embodiments, the first section 710' and the third section 720' may be manufactured from relatively thin materials, for example, thin plastic or sheet metal, for example, aluminum sheet metal. As such, the first section 710' and the third section 720' may be relatively flimsy or flexible. However, since each of the first section 710' and third section 730' are attached to the frame 200 the door 700' is relatively rigid. Thus, in example embodiments, the frame 200 is not only configured to facilitate sealing a compartment (with seal 400), it is also configured to be the primary structural member of door 700'.

Figure 26:
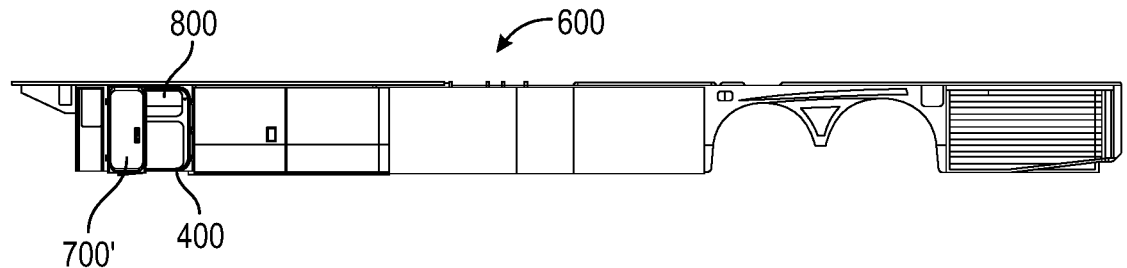
FIG. 26 is a side view showing a portion of a vehicle chassis having a compartment surrounded by a seal and a door in an open position allowing access to the compartment in accordance with example embodiments.
Figure 27:
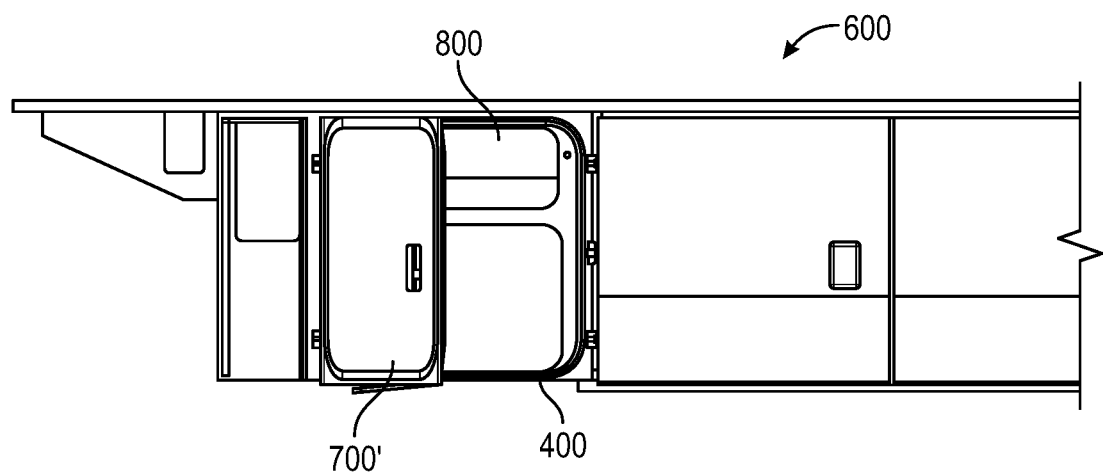
FIG. 27 is a side view showing a portion of a vehicle chassis having a compartment surrounded by a seal and a door in an open position allowing access to the compartment in accordance with example embodiments.
Figure 28:
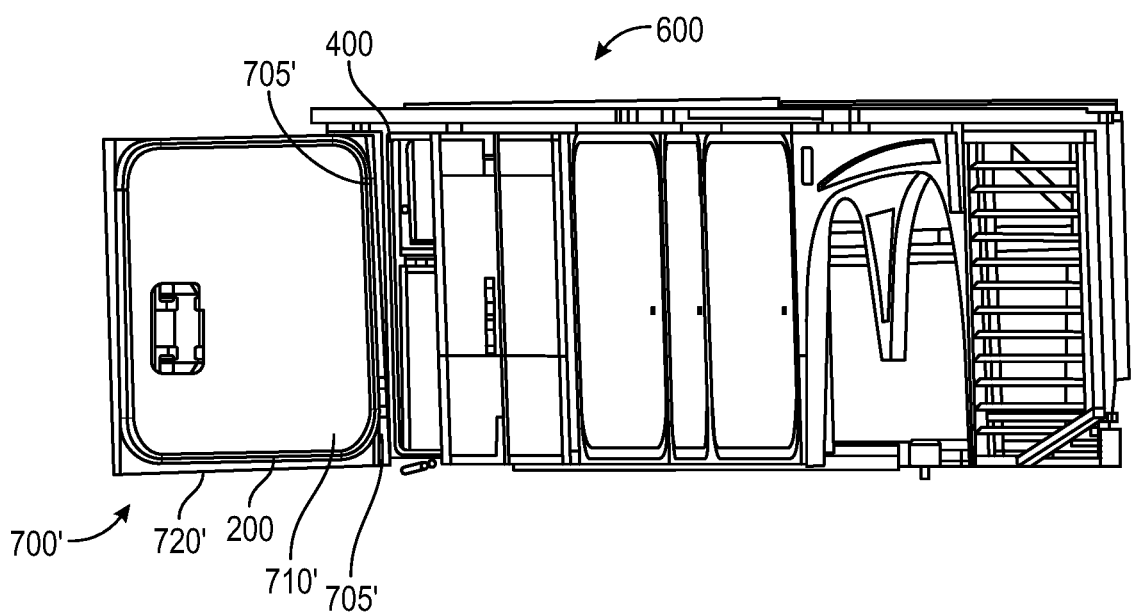
FIG. 28 is a side view showing a portion of a vehicle chassis having a compartment surrounded by a seal and a door in an open position allowing access to the compartment in accordance with example embodiments.
Figure 29:
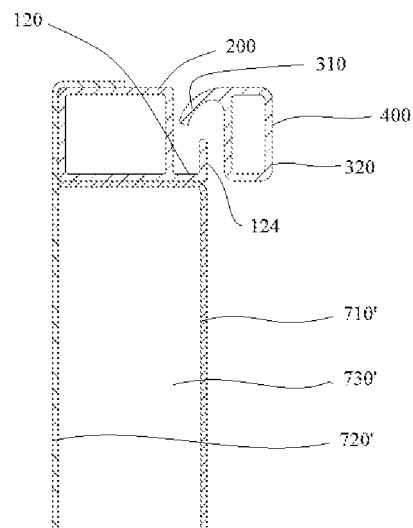
FIG. 29 is a cross-section view of a door nearly contacting a seal in accordance with example embodiments.
Figure 30:
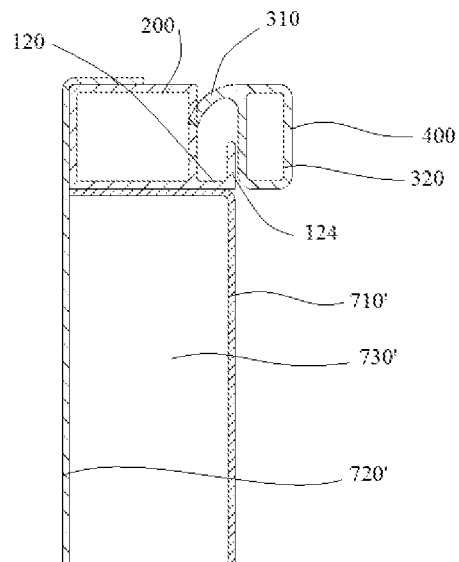
FIG. 30 is a cross-section view of a door contacting a seal in accordance with example embodiments.

FIGS. 26-28 illustrate a portion of a recreational vehicle 600 to which door 700' is attached via a pair of hinges 705'. FIGS. 26-28 show the door 700' in an open position. In this position the door provides access to the compartment 800. As shown in FIGS. 26-28 the door 700' is arranged over an opening 802 of a compartment 800 the perimeter of which is circumscribed by the seal 400. In this nonlimiting example embodiment the door 700' is attached to the recreational vehicle 600 by one or more hinges. It is understood, however, that this aspect of the example embodiments is provided merely for the purpose of illustration as the door 700' may be connected to the recreational vehicle 600 by any number of well understood connection means. FIG. 29 illustrates a cross-section of the door 700' nearly engaging the seal 400 in a nearly closed position whereas FIG. 30 illustrates a cross-section of the door 700' in a closed position where the frame 200 of the door 700' engages the seal 400 surrounding the compartment 800. As shown in FIG. 30, when the door is closed finger 310 of the seal 400 engages the side 116 of the frame 200 and the elongated ledge 120 contacts the body 320 of the seal 400 to create a seal to protect contents of the compartment. It is understood that when the door 700' is in the closed position the door 700' covers the compartment 800.

The inventive concepts disclosed herein are not limited by the example embodiments illustrated in the figures. For example, in example embodiments the frame 200 is illustrated as being mounted on a door 700 or as a structural element of a door 700'. However, in example embodiments, rather than using the frame 200 as part of a door, it may be arranged around a perimeter of a compartment in a vehicle with the ledge 120 facing outward from the vehicle. In this embodiment, the frame 200 could actually reinforce panels of the vehicle. In this this embodiment the seal 400 may be placed on the door in a manner that engages the frame 200 when the door to which it is attached is closed. In a sense, the arrangement of the frame 200 and seal 400 is opposite that of the previously described embodiments in that in this latter embodiment the seal 400 is on the door and the frame 200 is on the chassis of a vehicle.

Figure 31:
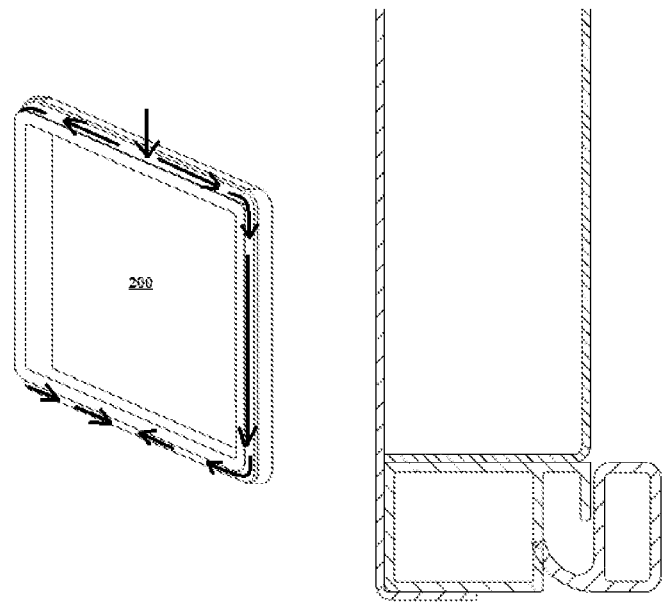
FIG. 31 illustrates water flow through a structure in accordance with an example embodiment.
Figure 32:
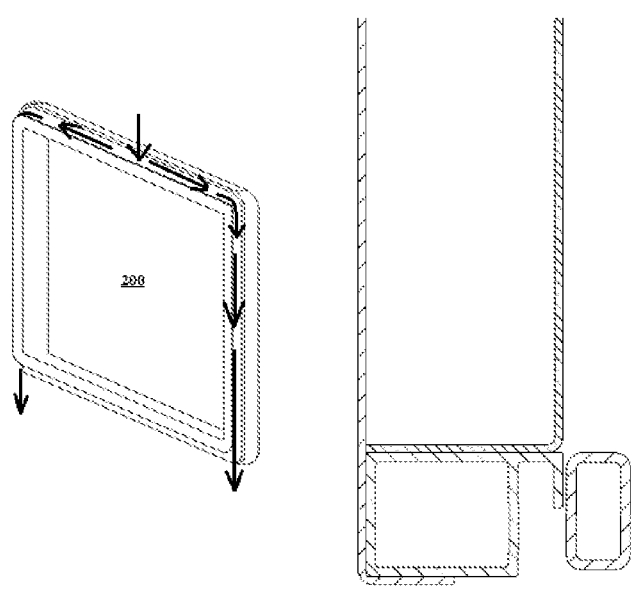
FIG. 32 illustrates water flow through a structure in accordance with an example embodiment.

FIGS. 31 and 32 illustrate a clear advantage of the sealing system of example embodiments. In FIGS. 31 and 32 various features of aforementioned doors are removed for clarity. The dark arrows represent a path water may take in the doors 700 and 700'. In FIG. 31 the seal 400 is formed in a ring shape. In this embodiment any water that breaches the seal between the finger like projection 320 of the seal 400 and the body 110 of the frame 200 will flow into the gutter regions 210 of the frame 200, the gutter regions 210 corresponding to the aforementioned ledges 120. When the doors 700 and 700' are closed the frame 200 is in vertical orientation. As such, water flowing into the upper most gutter would flow to the two vertical gutters and down into the lower most gutter. When the seal 400 is in the ring shape water may collect in the bottom gutter due to the seal between the finger like projection 320 and the body 110 of the frame 200. However, because example embodiment allow for holes, apertures, or cutouts to be present in the fingerlike projections 320 near the lower most gutter, water may flow through the holes, apertures, or cutouts. In FIG. 32 the fingerlike projections 320 are not present in the lower part of the seal 400, as such, rather than collecting in the lower most gutter region of the frame 200, the water would simply drain out of the frame 200 via the vertical gutters.

Figure 33:
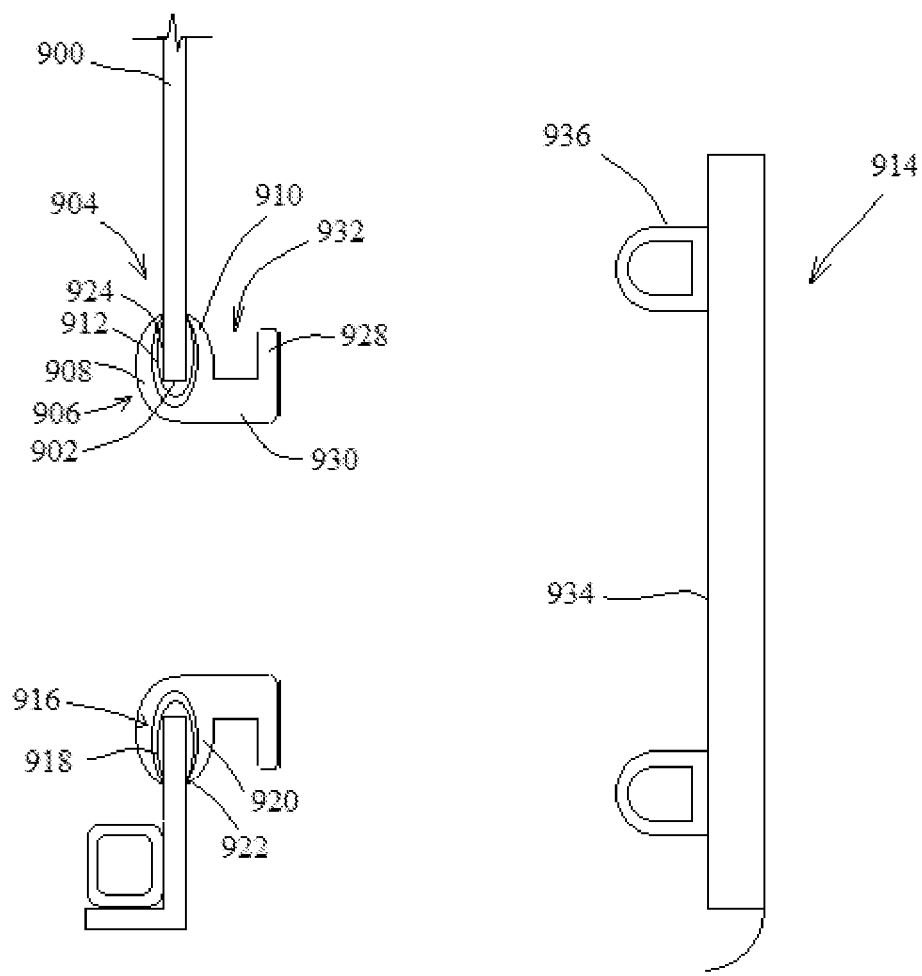
FIG. 33 illustrates another embodiment of a door with a first sealing member mounted to a flange positioned around the opening of a compartment and a second sealing member mounted to the door, wherein the configuration provides two layers of seals.
Figure 34:
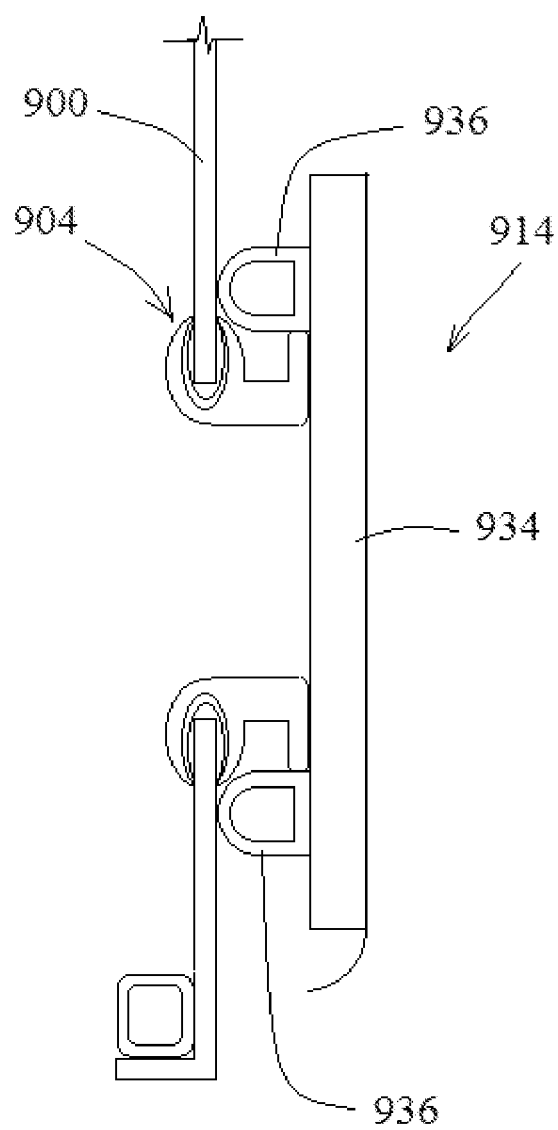
FIG. 34 illustrates the door with the first sealing member mounted to a flange positioned around the opening of a compartment and the second sealing member mounted to the door, wherein the configuration provides two layers of seals and the door is closed.

In an alternative arrangement, with reference to FIGS. 33 and 34, another form of a sealing system 10 is presented. In this arrangement, a wall 900 extends around the opening of compartment 800. This wall 900 terminates in an end 902. In this way, wall 900 and its terminal end 902 forms a flange that extends toward the opening of compartment 800 which is positioned at the outward end of compartment 800 towards door 700. A first sealing member 904 is connected to the end 902 of wall 900 that helps to facilitate sealing of the compartment 800.

First sealing member 904 is formed of any suitable size, shape and design and facilitates connection to wall 900 and sealing of compartment 800. In one arrangement, as is shown, as one example, first sealing member 904 includes a main body 906 that is configured to engage and hold onto the end 902 of wall 900. Main body 906 includes an inner member 908 and an outer member 910 that form an opening 912 between inner member 908 and outer member 910. The opening 912 of main body 906 is configured to receive and hold the end 902 of wall 900 therein. In one arrangement, as is shown, as one example, opening 912 is formed as a groove or a slot that receives the end 902 of wall 900 and a length of wall 900 so as to provide adequate overlap for purposes of a strong, durable and long-lasting connection as well as to provide adequate surface area for purposes of connecting and sealing between wall 900 and first sealing member 904.

Main body 906 connects to the end 902 of wall 900 by any manner, method or means such as by adhesively connecting main body 906 to the end 902 of wall 900, welding main body 906 to the end 902 of wall 900, friction-fitting main body 906 to the end 902 of wall 900, snap fitting main body 906 to the end 902 of wall 900, bolting or screwing main body 906 to the end 902 of wall 900, or by connecting main body 906 to the end 902 of wall 900 by any other manner, method or means or combination of thereof.

In one arrangement, first sealing member 904 is made of a relatively flexible and/or compressible material, such as a foam, a rubber, a foam rubber, or any other flexible and/or compressible material which is capable of forming a seal with door 914. In one arrangement, first sealing member 904 includes a core 916 that is positioned within opening 912. Core 916 is formed of any suitable size, shape and design and facilitates and/or strengthens the connection of first sealing member 904 to the end 902 of wall 900. In one arrangement, as is shown, core 916 is a rigid and durable liner that fits within opening 912 and helps to connect to the end 902 of wall 900. In one arrangement, as is shown, core 916 contours to the interior of opening 912 and in this arrangement forms generally has a C-shape when viewed from the side which includes an inner member 918, an outer member 920 and an opening 922 or slot that connects to a hollow interior 924 between inner member 918 and outer member 902 and allows the entry of end 902 of wall 900 therein.

In one arrangement, core 916 is formed of a metallic material, so as to provide maximum strength and durability. However, in other arrangements, core 916 is formed of other rigid materials such as a strong and durable plastic or composite material. In one arrangement, the opening 922 of core 916 is sized to provide a bias force upon the wall 900 when wall 900 is placed within opening 922. That is, when first sealing member 904 is placed onto wall 900 core 916 applies grips or applies a frictional force upon wall 900 which helps to hold first sealing member 904 onto wall 900. This frictional force may be complimented by other components, such as one-way gripping features, screws, bolts, inter-engaging locking members, snap fit features, adhesives, or any other component that may help hold first sealing member 904 onto wall 900.

Core 916 may be adhered to first sealing member 904. Alternatively, core 916 may be formed within the material of first sealing member 904. Alternatively, first sealing member 904 may be formed to core 916. Any other manner, method or means of connecting core 916 and first sealing member 904 is hereby contemplated for use.

Like other embodiments presented herein, first sealing member 904 includes a elongated ledge 926 that extends outward from the outer member 910 of main body 906 of first sealing member 904. In the arrangement shown, as one example, elongated ledge 926 includes a first member 928 that extends outward from out outer member 910 a distance. In the arrangement shown, first member 928 connects to 910 member 910 adjacent an end opposite wall 900. The outward end of first member 928 connects to a second member 930. Second member 930 connects to the outward end of first member 928 and extends toward wall 900. In this way, the connection of outer member 910, first member 928 and second member 930 form a groove or channel 932 there between that is configured to capture water and other contaminants and prevent them from entering compartment 800 as is described herein. In the arrangement shown, as one example, when viewed from the side, the connection of outer member 910, first member 928 and second member 30 generally form a U-shaped channel 932.

In the arrangement shown, as one example, when door 914 is closed, the outer surface of second member 930 engages, compresses and seals with the interior surface of inner member 934 of door 914. This seal helps to prevent water and other contaminants from entering compartment 800. Any water or contaminants that get between door 914 and compartment 800 are stopped by first sealing member 904 and any water or contaminants are captured in the channel 932 which directs the water or contaminants around compartment 800 which eventually drain away from compartment 800.

To increase sealing and to provide another level of defense, a second sealing member 936 is connected to the door 914 and is positioned just outward from or around first sealing member 904. In this way, as the door 914 closes the second sealing member 936 seals to wall 900 just outward or around first sealing member 904. This second sealing member 936 and its seal to wall 900 provides an added layer of protection and/or provides an improved dual-sealing arrangement.

Second sealing member 936 is formed of any suitable size, shape and design and is configured to connect to door 914 and form a seal with wall 900. In one arrangement, as is shown, when viewed from the side, second sealing member 936 is formed of a generally D-shaped member, however any other shape is hereby contemplated for use such as square, rectangular, round, oval, or any other polygon shape or any other shape. In one arrangement, second sealing member 936 is made of a relatively flexible and/or compressible material, such as a foam, a rubber, a foam rubber, or any other flexible and/or compressible material which is capable of forming a seal with door 914.

In the arrangement shown, as one example, second sealing member 936 is connected to the inner member 934 of door 914 just outward from or around first sealing member 904 is connected to wall 900. In one arrangement, second sealing member 936 is adhered to inner member 934, however any manner of connecting second sealing member 936 to inner member 934 of door 914 is hereby contemplated for use such as welding, screwing, bolting, friction fitting or any other manner of method of connecting two components together.

In this arrangement, when door 914 is closed, the inward facing end or surface of second sealing member 936 engages, compresses and seals with the outward facing surface of wall 900 just outward of first sealing member 904. This seal helps to prevent water and other contaminants from entering compartment 800. More specifically, this seal helps to prevent water and other contaminants from even getting to first sealing member 904. Any water or contaminants that get between door 914 and compartment 800 are stopped by second sealing member 936 and if any water or contaminants get past second sealing member 936, they are stopped by first sealing member 904 and any water or contaminants are captured in the channel 932 which directs the water or contaminants around compartment 800 which eventually drain away from compartment 800.

To allow draining of water and contaminants that are captured within the channel 932 of first sealing member 904, the second sealing member 936 at the lower side of compartment 800 may be removed, may have cuts therein, may have holes therein or may otherwise have pathways therein that allow for the water to drain out of the area between first sealing member 904 and second sealing member 936.

Example embodiments of the invention have been described in an illustrative manner. It is to be understood that the terminology that has been used is intended to be in the nature of words of description rather than of limitation. Many modifications and variations of example embodiments are possible in light of the above teachings. Therefore, within the scope of the appended claims, the present invention may be practiced otherwise than as specifically described.

What I claim is:

1. A sealing system for a compartment of a vehicle, vehicle having an edge that defines an opening that provides access to a hollow interior of the compartment, the system comprising:
    a door assembly;
    the door assembly operatively connected to the vehicle and configured to move between an open position and a closed position;
    the door assembly configured to cover the opening when the door assembly is in the closed position;
    the door assembly configured to allow access to the opening when the door assembly is in the open position;
    the door assembly having an outer side;
    the door assembly having an inner side;
    the door assembly having an outer skin;
    the door assembly having an inner skin;
    a frame member;
    the frame member connected to the door assembly;
    the frame member having a main body;
    the main body of the frame member having an outer side;
    the main body of the frame member having an inner side;
    the main body of the frame member having an inward facing side;
    the main body of the frame member having an outward facing side;
    the main body of the frame member having a channel;
    wherein the channel extends inwardly from the inner side of the main body of the frame member;
    a seal member;
    the seal member connected to the edge defining the opening;
    the seal member having a main body;
    the main body of the seal member having an outer side;
    the main body of the seal member having an inner side;
    the main body of the seal member having an inward facing side;
    the main body of the seal member having an outward facing side;
    the main body of the seal member having a finger;
    wherein the finger extends outwardly from the outer side of the main body of the seal member;
    wherein when the door assembly is in the closed position, the outward facing side of the main body of the seal member engages a lip of the channel thereby forming a first seal while the finger of the seal member overlaps the channel;
    wherein when the door assembly is in the closed position, an outer end of the finger engages the inward facing side of the main body of the frame member outward of the channel thereby forming a second seal;
    wherein when at least one of water, dirt, and debris penetrates the second seal, the at least one of water, dirt, and debris is received by the channel of the frame member which directs the at least one of water, dirt, and debris around the opening thereby preventing the at least one of water, dirt, and debris from entering the compartment.

2. The system of claim 1, wherein when the at least one of water, dirt, and debris penetrates the second seal, the at least one of water, dirt, and debris is received by the channel of the frame member which directs the at least one of water, dirt, and debris around the opening while the first seal prevents the at least one of water, dirt, and debris from entering the compartment.

3. The system of claim 1, wherein the door assembly is generally square or rectangular and the frame member is generally square or rectangular.

4. The system of claim 1, wherein the outward facing side of the main body of the frame member is adhered to an interior facing side of the inner skin of the door assembly.

5. The system of claim 1, wherein the inward facing side of the main body of the seal member is adhered to the vehicle adjacent the edge of the opening.

6. The system of claim 1, wherein the main body of the frame member includes a hollow interior.

7. The system of claim 1, wherein the main body of the seal member includes a hollow interior.

8. The system of claim 1, wherein the frame member is formed of a single continuous member that is bent into a generally square or rectangular shape.

9. The system of claim 1, wherein the frame member is formed of a single continuous member that is bent into a generally square or rectangular shape that extends along an entire peripheral edge of the inner skin of the door assembly.

10. The system of claim 1, wherein the seal member is formed of a single continuous member that is bent into a generally square or rectangular shape.

11. The system of claim 1, wherein the seal member is formed of a single continuous member that is bent into a generally square or rectangular shape that extends along an entirety of the edge of the opening.

12. The system of claim 1, wherein the channel of the frame member is formed by the inward facing side of the main body of the frame member, an inward extending arm and the lip that extends parallel with the inner skin of the door assembly.

13. The system of claim 1, wherein at least portions of the finger are removed adjacent a lower end of the door assembly so as to allow the at least one of water, dirt and debris captured by the channel to drain out of the channel.

14. The system of claim 1, wherein holes are placed in the finger adjacent a lower end of the door assembly so as to allow the at least one of water, dirt and debris captured by the channel to drain out of the channel.

15. A sealing system for a compartment of a vehicle, the vehicle having an edge that defines an opening that provides access to a hollow interior of the compartment, the system comprising:
a door assembly;
the door assembly operatively connected to the vehicle and configured to move between an open position and a closed position;
the door assembly configured to cover the opening when the door assembly is in the closed position;
the door assembly configured to allow access to the opening when the door assembly is in the open position;
the door assembly having an outer side;
the door assembly having an inner side;
a frame member;
the frame member connected to the door assembly;
the frame member having a main body;
the main body of the frame member having a channel;
wherein the channel extends inwardly from an inner side of the main body of the frame member;
a seal member;
the seal member connected to the edge defining the opening;
the seal member having a main body;
the main body of the seal member having a finger;
wherein the finger extends outwardly from an outer side of the main body of the seal member;
wherein when the door assembly is in the closed position, the outer side of the main body of the seal member engages an inner side of the channel of the frame member thereby forming a first seal while the finger of the seal member overlaps the channel;
wherein when the door assembly is in the closed position, an outer end of the finger engages the inner side of the main body of the frame member outward of the channel thereby forming a second seal;
wherein when at least one of water, dirt and debris penetrates the second seal, the at least one of water, dirt and debris is received by the channel of the frame member which directs the at least one of water, dirt and debris around the opening thereby preventing the at least one of water, dirt and debris from entering the compartment.

* * * * *